(12) United States Patent
Takagi

(10) Patent No.: US 9,075,669 B2
(45) Date of Patent: Jul. 7, 2015

(54) TIME SERIES DATA PROCESSING DEVICE, TIME SERIES DATA PROCESSING METHOD AND TIME SERIES DATA PROCESSING PROGRAM STORAGE MEDIUM

(71) Applicant: NEC CORPORATION, Tokyo (JP)

(72) Inventor: Masamichi Takagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/381,601

(22) PCT Filed: Mar. 5, 2013

(86) PCT No.: PCT/JP2013/001364
§ 371 (c)(1),
(2) Date: Aug. 28, 2014

(87) PCT Pub. No.: WO2013/136717
PCT Pub. Date: Sep. 19, 2013

(65) Prior Publication Data
US 2015/0067703 A1  Mar. 5, 2015

(30) Foreign Application Priority Data
Mar. 16, 2012 (JP) .................................. 2012-060863

(51) Int. Cl.
*G06F 3/00* (2006.01)
*G06F 9/44* (2006.01)
(Continued)

(52) U.S. Cl.
CPC .............. *G06F 9/542* (2013.01); *G06F 9/4881* (2013.01); *G06F 9/48* (2013.01)

(58) Field of Classification Search
CPC .......... G06F 9/542; G06F 9/48; G06F 9/4881

USPC .......................................................... 719/318
See application file for complete search history.

(56) References Cited

U.S. PATENT DOCUMENTS 6,744,274 B1 *  6/2004  Arnold et al. .................... 326/16
6,842,034 B1 *  1/2005  Chan et al. ......................... 326/8
(Continued)

FOREIGN PATENT DOCUMENTS

JP        2000-091435      3/2000
JP        2000-137620      5/2000
(Continued)

OTHER PUBLICATIONS

International Search Report—PCT/JP2013/001364—Apr. 9, 2013.

*Primary Examiner* — Timothy A Mudrick
(74) *Attorney, Agent, or Firm* — Young & Thompson

(57) ABSTRACT

Provided is a time series data processing device with which it is possible to change to a new process during the execution of an old process, and to control the selection and the output sequence of output data when processes are switched. A first processing unit executes a first process and generates first results data, and a second processing unit executes a second process and generates second results data. When an instruction to change processes is received from the outside, the first process in the first processing unit is stopped, and output of the first results data is prohibited. Then, the process in the first processing unit is changed from the first process to a third process and is started, and output of third results data is enabled. On the basis of third identification information appended to the third results data and second identification information appended to the second results data, the set of the third results data or the set of the second results data is selected, and the results data contained in the selected set of results data is output.

9 Claims, 33 Drawing Sheets

(51) Int. Cl.
- *G06F 9/46* (2006.01)
- *G06F 13/00* (2006.01)
- *G06F 9/54* (2006.01)
- *G06F 9/48* (2006.01)

(56) References Cited

U.S. PATENT DOCUMENTS

2008/0273036 A1* 11/2008 Kishimoto et al. ........... 345/440
2015/0106332 A1* 4/2015 Takagi ........................ 707/638

FOREIGN PATENT DOCUMENTS

| | | |
|---|---|---|
| JP | 2004-078550 | 3/2004 |
| JP | 2004-178472 | 6/2004 |
| JP | 2004-274141 | 9/2004 |
| JP | 2006-522416 | 9/2006 |
| JP | 2007-108910 | 4/2007 |
| JP | 2010-198307 | 9/2010 |
| WO | 2009/063596 | 5/2009 |

* cited by examiner

Fig.12

| RESULTS DATA | PROCESS ID | VERSION NUMBER |

Fig.25

| TIME | 1 | 2 | 3 | 4 | 5 |
|---|---|---|---|---|---|
| INPUT | 1 | 2 | 3 | 4 | 5 |
| WINDOW DATA OF OLD PROCESS | [ ] ⇒ [1] | [1]⇒[1,2] | [1,2]⇒[2,3] | [2,3]⇒[3,4] | [3,4]⇒[4,5] |
| RESULTS OF OLD PROCESS | | 3 | 5 | 7 | 9 |
| INSTRUCTION TO REWRITE | | | REWRITE TO NEW PROCESS | | |
| WINDOW DATA OF NEW PROCESS | | | [ ]⇒[3] | [3]⇒[3,4] | [3,4]⇒[3,4,5] |
| RESULTS OF NEW PROCESS | | | | | 12 |

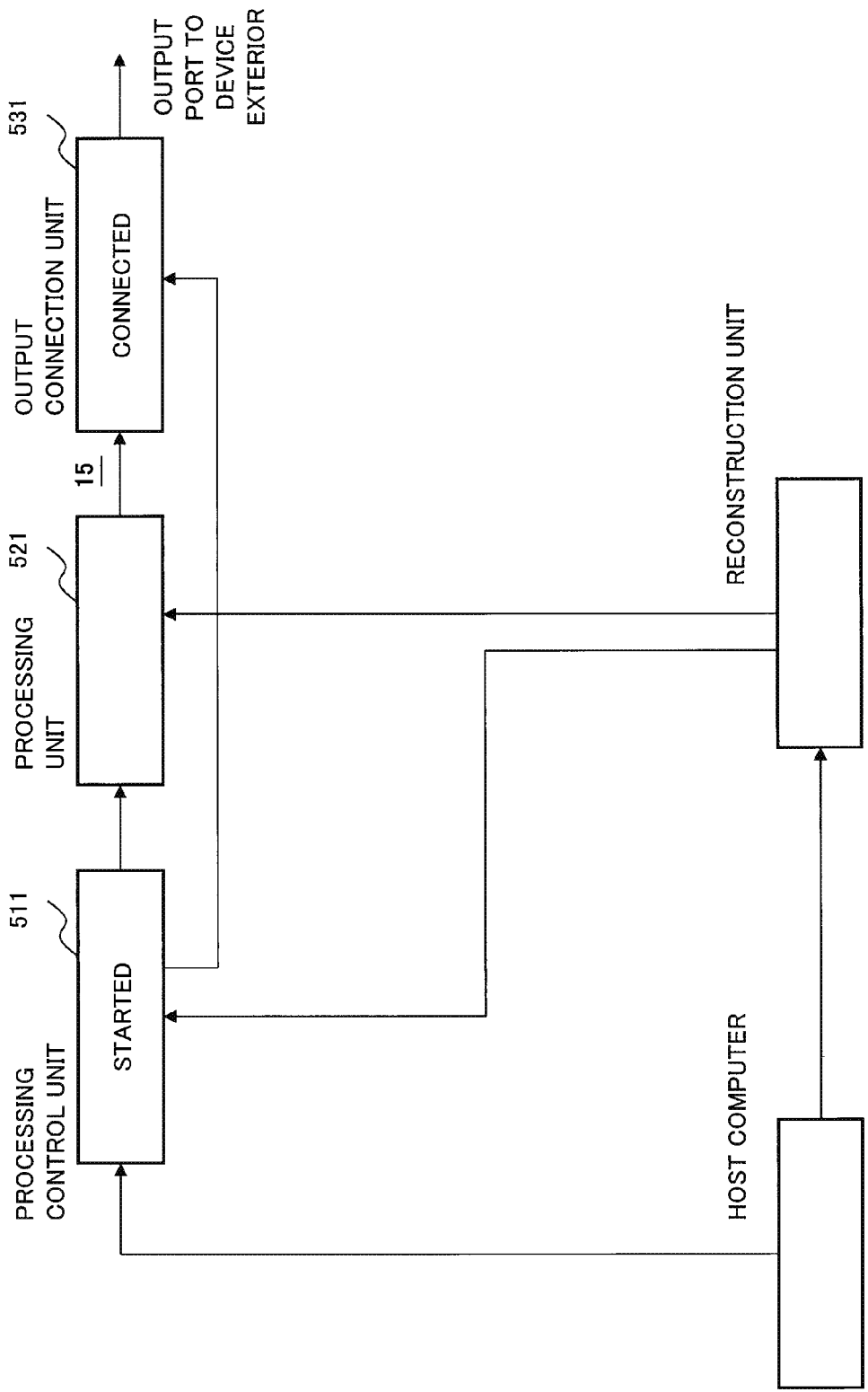

TIME SERIES DATA PROCESSING DEVICE, TIME SERIES DATA PROCESSING METHOD AND TIME SERIES DATA PROCESSING PROGRAM STORAGE MEDIUM

TECHNICAL FIELD

The present invention relates to a time series data processing device, a time series data processing method and a time series data processing program storage medium that process time series data. In particular, it relates to a time series data processing device, a time series data processing method and a time series data processing program storage medium that can, while continuing execution of a process in a certain area on a device, change a process in other arbitrary area.

BACKGROUND ART

First, "data processing concerning the time series data" will be explained. In this description, "data processing concerning the time series data" means a process that is carried out for time series input data, that is, a series of data inputted one after another. Results data of the data processing concerning the time series data is also outputted one after another similarly. "To be inputted one after another" means that a plurality of data arrives at a processing device at different timing over a certain period of time respectively. As an example of the data processing concerning the time series data, such as a process that calculates a sum of nearest two values of the time series data can be mentioned. Hereinafter, the data processing concerning the time series data is simply called as "the time series data processing".

In the following explanation, an array of data is represented as [1, 2, 3, 4], a set (collection of elements) of data is represented as {1, 2, 3, 4}, and a set of data is represented as <10 degrees, January 1> by distinguishing them with different kinds of parentheses. Also, individual numerical values of data such as 1 and 2 are transcribes as "1" and "2" and are distinguished from codes that show components.

Also, a period of a clock used for operation of a time series data processing device is called "a cycle", and it is used as a unit of a period of time. "Start time of cycle" means the first point of time of the period of time and "end time of cycle" means the last point of time of the period of time. For example, in case a frequency of a clock is 1 GHz, concerning a certain reference time, the first cycle means a period of time between the reference time plus zero second and the reference time plus 1 nanosecond, and the N-th cycle means a period of time between the reference time plus (N−1) nanoseconds and the reference time plus N nanoseconds. Start time of the M-th cycle means the reference time plus (M−1) nanoseconds, and end time of the M-th cycle means the reference time plus M nanoseconds.

Here, input data is a set consisting of no smaller than one value. As an example, a set of temperature and date, a set of temperatures only and a set of brand name, stock price and time can be mentioned. For example, the set of temperature and date is represented as <10 degrees, January 1>. In case there is no concern that they are confused, input data and a value handled by a device are simply called "data".

The time series data processing is often carried out to a plurality of input data. Further, the time series data processing is often carried out to a window of time series data. "Window" is a set (collection of elements) of input data, and there are two kinds. One is, supposing that a predefined number is N (N is an integer of no smaller than 1), a set (collection of elements) of input data of nearest N pieces. The other is, supposing that a period of time at a certain predefined time is P and regarding one element of a set of input data as time, a set (collection of elements) of input data that fits into the period of time.

For example, it is supposed that input data is a set of temperature and date, and that time series data such as <10 degrees, January 1>, <11 degrees, January 2>, <10 degrees, January 3> and <10 degrees, January 4> are given. The window that fits into a period of time from January 4 to the last 3 days is {<11 degrees, January 2>, <10 degrees, January 3> and <10 degrees, January 4>}.

Also, a set (collection of elements), a subset (collection of elements) and an element of input data in a window are called "window data". In the time series data processing, this window data is often stored. In the following explanation, the window or the window data is represented as an array or a set (collection of elements).

It is supposed that time series data processing is executed using an IC (Integrated Circuit) chip that has in plural an area (hereinafter, referred to as "a partition") that can define contents of a process and specifically, an area in which circuit information and so on for constructing a circuit that executes the process can be written. As an example of such an IC chip, an FPGA (Field Programmable Gate Array) can be mentioned. Or, it is possible to execute the time series data processing by using, as the IC chip, a processor that reads a program from a memory and executes it. In this case, the process contents, that is, a program that designates a procedure of the process, may be written in the memory.

In the time series data processing, it is supposed that a first user defined process (referred to as "a process to be updated") is being executed in the first partition, and a second user defined process (referred to as "an old process") is being executed in the second partition. At this time, there exist needs that wants to change the process to be updated to a third user defined process (referred to as "a new process") while continuing execution of the old process. That is, while continuing execution of the old process in the second partition, the process to be updated in the first area is stopped and changed to the new process. And execution of the new process is started, and after that, the old process in the second area is stopped. By changing from the old process to the new process by the procedure as mentioned above, it is possible, while guaranteeing temporal continuity, to change the process contents of the time series data processing device.

As an example, consider an application that calculates an index to decide timing to purchase or sell financial products such as a stock. Depending on a brand of financial products to be purchased or sold and a strategy to purchase or sell, there exists a plurality of indices that is necessary, and sets (collection of elements) of the indices that should be outputted are different. A certain device can calculate only a finite number of indices simultaneously. Depending on time, the brand to be purchased or sold and the strategy change. Therefore, there exist needs that want to change the indices to be calculated depending on the brand to be purchased or sold at that time and on the strategy.

An example of change of processes in the background art will be explained using FIG. 25. It is supposed that an old process that calculates a sum of nearest two values is changed to a new process that calculates a sum of nearest three values.

Also, it is supposed that data is inputted every 1 cycle, and explanation will be made by using time with 1 cycle as a unit.

At start time of the first cycle, time series data 1 is inputted and the old process stores the value as window data.

At start time of the second cycle, time series data 2 is inputted and the old process stores the value as window data. Also, since the old process obtained nearest two values, "3" is outputted as results data.

At start time of the third cycle, an instruction to rewrite to circuit information that executes the new process is issued. It is supposed that the process operating in an area where the circuit information that executes the new process is planned to be written is stopped, and further, the circuit information that executes the new process is written in a device and operation has started. Here, it is supposed that the circuit information that executes the new process is written in an area different from the old process and the old process and the new process operate in parallel for a while.

At start time of the third cycle, time series data "3" is inputted and the new process stores the value as window data.

At start time of the fourth cycle, time series data "4" is inputted and the new process stores the value as window data.

At start time of the fifth cycle, time series data "5" is inputted and the new process stores the value as window data. Also, since the new process obtained nearest three values, "12" is outputted as results data.

Here, the old process is stopped or deleted, and the change of the processes is completed.

Further, there is a case when control is desired concerning output order of the results of the new process and the results of the old process to device exterior and selection of the process results as output target from the results of the new process and the results of the old process. In particular, it is important to make the results of the new process and the results of the old process not to be outputted to device exterior being mixed. Further, it is also effective to output, among the results of the old process before and after the process is changed, those that are still useful and available after execution of the new process has started to device exterior to the maximum. Further, to control the output order and the selection of the output target and to output the desired results in the desired order is called "to align". Detained explanation related to "alignment" will be described later.

As an example, consider the application mentioned above that calculates an average of the values of the temperature sensor over a certain period of time and detects an emergency situation including a fire. At this time, when temperature change has become intense, in order to raise speed that follows the temperature change, it is desirable to change a width of the period of time to calculate the average of the temperature. Also, in order that the results of the old process and the new process are not confused, it is also necessary to change the processes so that both of the results may not be outputted to device exterior being mixed. Further, since also the results of the old process are still useful and available, it is desirable to receive the results of the old process from the device as much as possible until the results of the new process are outputted to device exterior. Needs as described above exist.

As another example, consider an application that carries out an order to purchase or sell financial products such as a stock. Since it is desired to change a brand to be purchased or sold, it is necessary to change the process of instruction to purchase or sell. The brand before the change is called "an old brand", and the brand after the change is called "a new brand". Also, when instructions related to the new and the old brand are mixed before and after the processes are changed, there is a concern that purchasing or selling may be mistaken. Therefore, it is necessary that the processes are changed while the results of both the new and the old process may not be outputted to device exterior being mixed. Also, since instructions to purchase or sell may be carried out to the old brand until the last timing, it is desirable to receive the results of the old process from the device as much as possible until the results of the new process are outputted to device exterior. Needs as described above exist.

Further, there are requirements that the user defined process cannot be stopped until the status that the process has been completed is reached, and accordingly, the partition in which the user defined process is operating cannot be made a target to write the circuit information that executes the new process.

As an example, consider the application mentioned above that issues the order to purchase or sell financial products such as a stock. Here, it is supposed that there is a rule that an order to purchase issued from the application and an order to sell issued after a while consecutively must be made a set. Once the process to carry out the order to purchase or sell has issued the order to purchase, after that, a user cannot stop the process until the process issues the order to sell. After that, during a period of time until the process issues next order to purchase, the user can stop the process. After that, when the process issues the order to purchase, the user cannot stop the process again.

That is, while the old process is operating in the second area of a device, by writing the circuit information that executes the new process in the first area of the device where the first user defined process (process to be updated) is operating, change from the old process to the new process is to be realized. At this time, there exist requirements that writing of the circuit information that executes the new process in the first area has to be carried out in a period of time after the process to be updated is completed.

Technologies related to the processes as above are described in PTL 1, 2 and 3 and NPL 1.

In PTL 1, a time series data processing device that can be reconstructed is disclosed. A block diagram of the time series data processing device of PTL 1 is shown in FIG. 26. The technology of PTL 1 is constructed in order to execute a process that a user defined, and includes a processing unit 621, a processing control unit 611, a reconstruction unit 622 and an output connection unit 631 that connects results of the processing unit to an output port to exterior. The processing unit 621 executes the process, and the processing control unit 611 controls start and stop of the process that operates in the processing unit 621. The reconstruction unit 622 carries out reconstruction of the processing unit 621. The output connection unit 631 connects or interrupts the processing unit 621 and the output port to exterior.

In PTL 2, an information processing system that can be reconstructed using a programmable logic circuit is disclosed. In the system of PTL 2, by using logic cell status data that reflects usage state of a logic cell of the programmable logic circuit, usable logic cells are discriminated.

In PTL 3, a reconfigurable circuit is disclosed. In the reconfigurable circuit of PTL 3, a reconstruction cell is equipped with a reset flag, and it is set to a protection mode that protects the reconstruction cell from reset or to a normal mode that does not protect it from reset.

In NPL 1, a time series data processing device that can be reconstructed is disclosed.

A block diagram of the time series data processing device of NPL 1 is shown in FIG. 27. The technology of NPL 1 is equipped with a host computer 501, a processing unit 521, a processing control unit 511, a reconstruction unit 522 and an output connection unit 531. The host computer 501 orders to change processes. The processing unit 521 is an area in which construction of a circuit that executes a process that a user defined (setting of circuit information that executes the process) is possible, and executes the process. The processing control unit 511 carries out start and stop of the process that operates in the processing unit 521. The reconstruction unit 522 carries out reconstruction of the processing unit 521. The output connection unit 531 transmits results of the processing unit 521 to an output port to device exterior.

Operation of the technology of NPL 1 will be explained using FIG. 28 to FIG. 33.

Here, from a status that a first process that calculates a sum of nearest two values is executed, operation to write a second process that calculates a sum of nearest three values will be explained. It is supposed that timing related to the processes is as follows.

1) Both the first process and the second process generate results in the same cycle as the cycle in which data is inputted.

2) The results of the process reach from the processing unit 521 to the output connection unit 531 in 1 cycle.

3) Data is inputted every 1 cycle. In the following explanation, time that makes 1 cycle as a unit is used.

At start time of the first cycle, the host computer 501 and the processing start unit 511 are in the status that the first process that operates in the processing unit 521 has been started. The output connection unit 531 enables output of the results of the first process to device exterior. Specifically, the output connection unit 531 connects output of the processing unit 521 to the output port.

At start time of the first cycle, "1" is inputted as time series data, and at start time of the second cycle, "2" is inputted as time series data. Since the first process obtained [1, 2] that are nearest two values, the processing unit 501 calculates and outputs "3" as the result. At end time of the second cycle, each part will be in the status as in FIG. 28.

At start time of the third cycle, an order to write the second process is issued from the host computer 502. The host computer 502 issues an order to the processing control unit 511 to reset the process that operates in the processing unit 521. The processing control unit 511 resets the process that operates in the processing unit 521. Further, the processing control unit 511 issues an order to the output connection unit 531 to interrupt output of the results of the process of the processing unit 521 to device exterior. The output connection unit 531 interrupts the connection of the processing unit 521 and the output port. At end time of the third cycle, each part will be in the status as in FIG. 29.

At start time of the fourth cycle, the host computer 502 sends construction information to the reconstruction unit 522. The reconstruction unit 522 sends the construction information to the processing unit 521. At end time of the fourth cycle, each part will be in the status as in FIG. 30.

At end time of the thirteenth cycle, reconstruction is completed. At start time of the fourteenth cycle, the reconstruction unit 522 notifies the processing control unit 511 of reconstruction completed. At end time of the fourteenth cycle, each part will be in the status as in FIG. 31.

At start time of the fourteenth cycle, the processing control unit 511 starts the process written in the processing unit 521. For example, the processing control unit 511 dis-asserts a reset signal. Further, the processing control unit 511 checks whether the process has started. For example, the processing control unit 511 checks whether a specific bit pattern is outputted from the processing unit 521.

At start time of the fifteenth cycle, the processing control unit 511 orders the output connection unit 531 to enable output of the results of the second process to device exterior. The output connection unit 531 enables output of the results of the second process to device exterior. Specifically, the output connection unit 531 connects output of the processing unit 521 to the output port. At end time of the fifteenth cycle, each part will be in the status as in FIG. 32.

In the time that follows, the second process continues to operate. Time series data "3" is inputted at start time of the sixteenth cycle, time series data "4" is inputted at start time of the seventeenth cycle, and time series data "5" is inputted at start time of the eighteenth cycle. Since the second process obtained [4, 5, 6] that are nearest two values, the processing unit 501 calculates and outputs "15" as the result. At end time of the eighteenth cycle, each part will be in the status as in FIG. 33.

The first user defined process (process to be updated) is executed in the first area on the device, and the second user defined process (old process) is executed in the second area. Here, update of the process is carried out when the old process in the second area is in execution. That is, the process to be updated being executed in the first area is stopped, and the circuit information of the circuit that executes the third user defined process (new process) is written in the first area. And execution of the new process is started, and the old process is stopped. As above, change from the old process to the new process is carried out.

CITATION LIST

Patent Literature

[PTL 1]
U.S. Pat. No. 6,744,272 (Columns 5-10, FIG. 2)
[PTL 2]
Japanese Unexamined Patent Application Publication No. 2000-091435 (Pages 4-6, FIGS. 1, 2 and 7) [PTL 3]
WO 2009/063596 (Pages 9-11, FIGS. 1-3)

Non Patent Literature

[NPL 1]
Simon Tam and Martin Kellermann, Fast Configuration of PCI Express Technology through Partial Reconfiguration, Xilinx, 2010.

SUMMARY OF INVENTION

Technical Problem

As above, in order to realize change to the new process while continuing execution of the old process, it is necessary to detect that the process to be updated that operates in the first area is in the stopped status, and to write the circuit information of the circuit that executes the new process in there. Further, when a notification of reconstruction completed has been received, it is necessary to detect reconstruction to which area has been completed. That is, by grasping the status in the first area and in the second area and by using the information, operation to rewrite the circuit information needs to be carried out. However, since the technology of NPL 1 handles only one area, change from the process to be updated to the new process while the old process is in execution, and start of the new process cannot be performed.

Also, in the change of the processes that is an object, there are requirements of "guarantee of alignment" concerning order of output of the results data of the old process and the results data of the new process to device exterior and selection of the results data of the output target between the results data of the new process and the results data of the old process.

"Guarantee of alignment" means to carry out control of relation about generation order and output order between the new process results data and the old process results data that exist in the time series data processing device simultaneously, and selection of the results data that is made the output target on the basis of time when the new process results data is generated. Details of "guarantee of alignment" will be described in detail in an explanation of an exemplary embodiment.

In order to guarantee alignment, the results data of the old process and the results data of the new process need to be distinguishable, and operation needs to be carried out using the information. However, since the technology of NPL 1 handles only one area, identification of the results data of the old process and the results data of the new process is not carried out. Accordingly, alignment about output of the results data of the old process and the new process to device exterior cannot be performed.

By the technology of PTL 1, since coordination of the information in a plurality of areas cannot be performed, there is a problem that grasping the status of the areas and operation using the information explained above cannot be performed.

Also, by the technology of PTL 1, since the information cannot be exchanged between pluralities of areas, alignment about output of the results data of the old process and the new process to device exterior cannot be performed.

By the technology of PTL 2, it is possible to grasp the status of the area whether the area is usable. However, the technology of PTL 2 is not one that considers change from the old process to the new process, and it is not equipped with a means to identify the process contents. That is, it is not equipped with the information to discriminate whether the results data outputted from the processing circuit is one by the old process or one by the new process. Accordingly, there is a problem that it cannot perform alignment about output of the results data of the old process and the new process to device exterior.

By the technology of PTL 3, to set effectiveness of the reset for each reconstruction cell is possible. However, the technology of PTL 3 is not meant to consider the change from the old process to the new process either, and it is not equipped with a means to identify the process contents. Accordingly, there is a problem that it cannot perform alignment about output of the results data of the old process and the new process to device exterior.

To summarize the above, in the technology of NPL 1 and PTL 1, there is a first problem that, for the processes in each of a plurality of areas, to grasp the status such as, completed, in execution, stopped and in reconstruction of the processing circuit, and operation of the change of the processes cannot be performed. This is because, about the processes in a plurality of areas, the status cannot be notified nor recorded.

Also, in the technology of NPL 1 and PTL 1-3, there is a second problem that, when changing from the old process to the new process while the old process is in execution, alignment concerning order of output of the results data of the old process and the new process to device exterior and selection of the results data of the output target cannot be guaranteed. This is because information such as the results data was generated by which process or information such as the present status of the old process and the new process necessary for alignment cannot be handled.

Object of Invention

The present invention is proposed in view of such circumstances, and is meant to provide a time series data processing device, a time series data processing method and a time series data processing program storage medium by which change to the new process while the old process is in execution, selection of output data when the process is changed, and control of output order are possible.

Solution to Problem

A time series data processing device of the present invention is characterized by being equipped with a first processing unit that is possible to reconstruct and that executes a first process or a third process and generates first results data or third results data; a second processing unit that executes a second process and generates second results data; a reconstruction unit that changes the process executed by the first processing unit from the first process to the third process; a first processing control unit that executes stop of the first process in the first processing unit and start of the third process in the first processing unit, and enables or prohibits output of the first results data and the third results data; a first output control unit that enables or prohibits output of the first results data and the third results data on the basis of an instruction of the first processing control unit; an information management unit that generates a first set of the results data by appending first identification information corresponding to contents of the first process to the first results data, generates a second set of the results data by appending second identification information corresponding to contents of the second process to the second results data, and generates a third set of the results data by appending third identification information corresponding to contents of the third process to the third results data; a status management unit that, when an instruction to change process is received from outside, instructs the first processing control unit to stop the first process, to start the third process, and to enable or to prohibit output of the first results data and the third results data, instructs the reconstruction unit to change from the first process to the third process, and instructs the information management unit to append the second identification information and the third identification information; and an output alignment unit that inputs the third set of the results data from the first output control unit and the second set of the results data from the second output control unit, selects either of the third set of the results data or the second set of the results data on the basis of the third identification information and the second identification information, and outputs the results data included in the selected set of the results data.

A time series data processing method of the present invention is characterized by: generating first results data by executing a first process in a first processing unit; generating a first set of the results data by appending first identification information corresponding to contents of the first process to the first results data; generating second results data by executing a second process in a second processing unit; generating a second set of the results data by appending second identification information corresponding to contents of the second process to the second results data; when an instruction to change process is received from outside, stopping the first process in the first processing unit and prohibiting output of the first results data; changing the process executed by the first processing unit from the first process to a third process; starting the third process and enabling output of third results data; generating a third set of the results data by appending third identification information corresponding to contents of the third process to the third results data; inputting the third set of the results data from the first output control unit, and inputting the second set of the results data from the second output control unit; selecting either of the third set of the results data or the second set of the results data on the basis of the third identification information and the second identification information; and outputting the results data included in the selected set of the results data.

A time series data processing program storage medium of the present invention stores a program that makes a computer equipped in a time series data processing device equipped with a first processing unit that executes a first process and outputs first results data and a second processing unit that executes a second process and outputs second results data, function as: a reconstruction means that changes the process executed by the first processing unit from the first process to a third process; a first processing control means that executes stop of the first process in the first processing unit and start of the third process in the first processing unit, and enables or prohibits output of the first results data and the third results data; a first output control means that enables or prohibits output of the first results data and the third results data on the basis of an instruction of the first processing control means; an information management means that generates a first set of the results data by appending first identification information corresponding to contents of the first process to the first results data, generates a second set of the results data by appending second identification information corresponding to contents of the second process to the second results data, and generates a third set of the results data by appending third identification information corresponding to contents of the third process to the third results data; a status management means that, when an instruction to change process is received from outside, instructs the first processing control means to stop the first process, to start the third process, and to enable or to prohibit output of the first results data and the third results data, instructs the reconstruction means to change from the first process to the third process, and instructs the information management means to append the second identification information and the third identification information; and an output alignment means that inputs the third set of the results data from the first output control unit and the second set of the results data from the second output control unit, selects either of the third set of the results data or the second set of the results data on the basis of the third identification information and the second identification information, and outputs the results data included in the selected set of the results data.

Advantageous Effect of Invention

According to the present invention, in the process of time series data, change to the new process while the old process is in execution, selection of the output data when the process is changed, and control of output order become possible.

BRIEF DESCRIPTION OF DRAWINGS

FIG. 12 A figure showing an example of a data structure of a set of results data.

FIG. 25 A time transition diagram of a status of an old process and a new process of an example of operation of a background art.

FIG. 33 A figure showing a status of output data in each unit at end time of the eighteenth cycle of a time series data processing device of NPL 1.

DESCRIPTION OF EMBODIMENTS

The First Exemplary Embodiment

Next, an exemplary embodiment of the present invention will be explained in detail with reference to drawings.

A time series data processing device of this exemplary embodiment executes user defined processes in a plurality of areas respectively, and while a process in a certain area is in execution, changes a process in other arbitrary area to a process that performs different operation.

The process before change is called "a first user defined process" or "an old process", and the process after change is called "a second user defined process" or "a new process". An area in which circuit information that executes the new process is written is called a first processing unit and an area in which circuit information that executes the old process is written and the old process is operating is called a second processing unit.

Change of the processes is carried out by the following steps.

(1) In order to write the circuit information that executes the new process in the first processing unit, the process operating in the first processing unit is stopped.

(2) The circuit information that executes the new process is written in the first processing unit.

(3) Operation of the new process is started.

(4) Output of the new process is started.

(5) Operation of the old process is stopped.

(6) The circuit information that executes the old process is deleted.

By changing the processes following the steps, a period of time during which results are not outputted is reduced.

The time series data processing may be realized using a device that has a plurality of areas in which circuit information that executes a process can be written. As an example of such a device, an FPGA can be mentioned. In this case, a first area in the FPGA corresponds to the first processing unit, and a second area corresponds to the second processing unit. Or, the time series data processing may be realized using a plurality of chips. In this case, a first chip corresponds to the first processing unit, and a second chip corresponds to the second processing unit.

Figure 2:
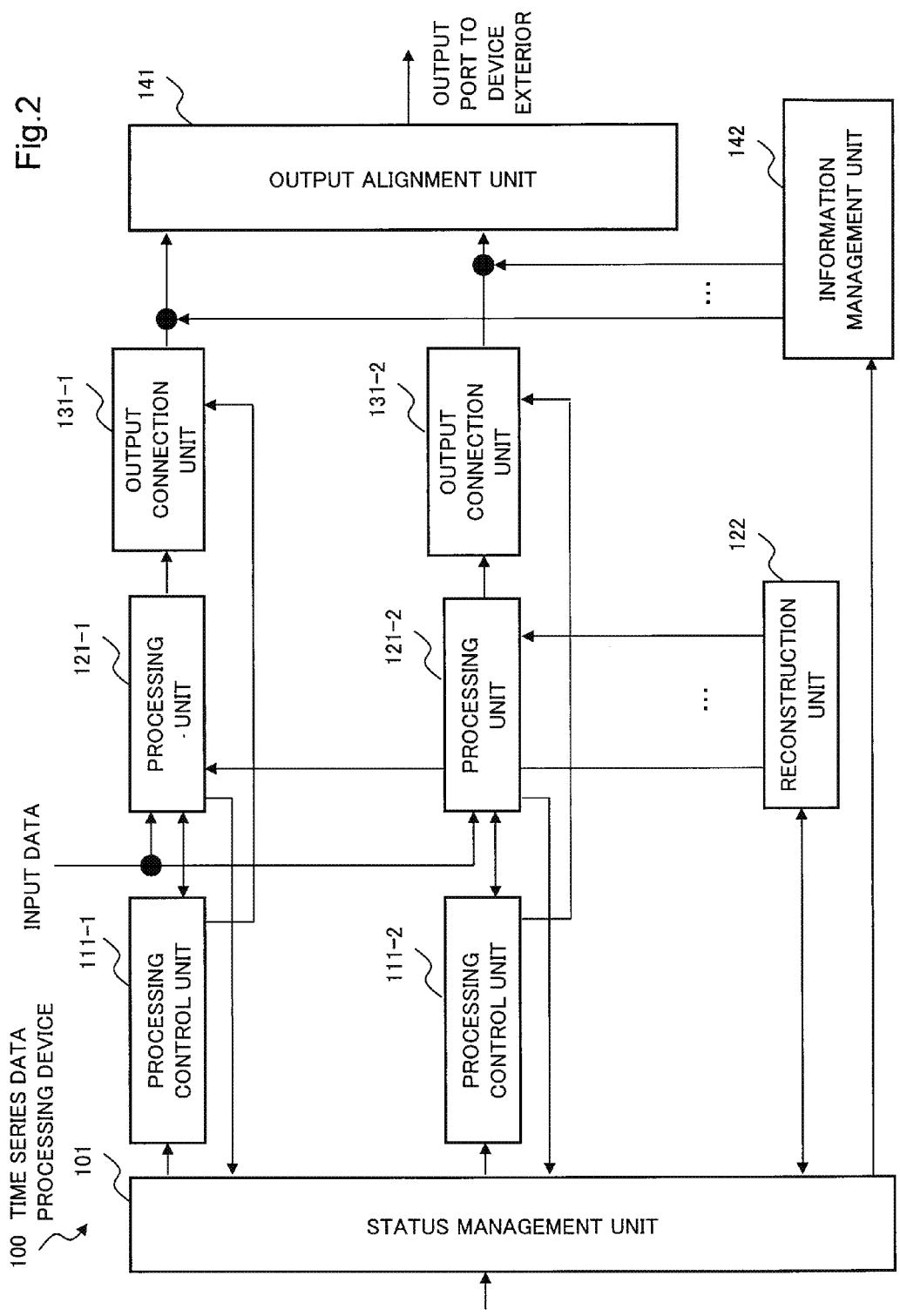
FIG. 2 A block diagram showing a construction of a time series data processing device of an exemplary embodiment of the present invention.

FIG. 2 is a block diagram showing a construction of the time series data processing device according to the exemplary embodiment of the present invention.

A time series data processing device 100 is equipped with a first processing units 121-1, a second processing unit 121-2, a status management unit 101, processing control units 111-1 and 111-2, a reconstruction unit 122, output connection units 131-1 and 131-2, an information management unit 142 and an output alignment unit 141.

The first processing unit 121-1 inputs data, executes the first user defined process and sends results data to the output connection unit 131. The first processing unit 121-1 outputs to the status management unit 101 a notification of process completed that shows it is in a status that the process is completed. The first processing unit 121-1 inputs an order to stop process from the processing control unit 111 and stops the first user defined process.

By the reconstruction unit 122, the first processing unit 121-1 is made to change the process to execute from the first user defined process to a third user defined process.

When an order to start process is inputted from the processing control unit 111, the first processing unit 121-1 starts the third user defined process, inputs data, executes it, and outputs results data to the output connection unit 131.

The second processing unit 121-2 inputs data, executes the second user defined process and outputs results data to the output connection unit 111.

The status management unit 101 inputs the notification of process completed from the first processing unit 121-1, and records that the first processing unit 121-1 is in the status that the process is completed. When the first processing unit 121-1 is in the status that the process is completed, the status management unit 101 outputs an order to stop sequence and records that the first processing unit 121-1 is in a stopped status.

Further, the status management unit 101 records a process ID and a version number of the second user defined process and the third user defined process in the information management unit 142. And the status management unit 101 instructs the reconstruction unit 122 to start reconstruction of the first processing unit 121-1, and records that the first processing unit 121-1 is in reconstruction.

When a notification of reconstruction completed is inputted from the reconstruction unit 122, the status management unit 101 records that reconstruction of the first processing unit 121-1 is completed and outputs an order to start sequence of the reconstructed third user defined process to the first processing unit 121-1.

When the order to stop sequence is inputted from the status management unit 101, the processing control unit 111 outputs the order to stop process to the first processing unit 121-1 and outputs an order to interrupt to the output connection unit 131.

Also, when the order to start sequence is inputted from the status management unit 101, the processing control unit 111 outputs the order to start process to the first processing unit 121-1. And the processing control unit 111 confirms successful start of the first processing unit 121-1 and outputs an order to connect to the output connection unit 131.

The reconstruction unit 122 reconstructs the first processing unit 121-1 and outputs the notification of reconstruction completed to the status management unit 101.

The output connection unit 131 inputs the results data of the first processing unit 121-1 or the second processing unit 121-2. When the order to connect is inputted from the processing control unit 111, the output connection unit 131 outputs the results data to the output alignment unit 141. When the order to interrupt is inputted from the processing control unit 111, the output connection unit 131 interrupts transmissions of the results data to the output alignment unit 141.

The information management unit 142 records the process ID and the version number of the second user defined process and the third user defined process. Also, the information management unit 142 appends a second process ID and the version number to the results data of the second user defined process and sends it to the output alignment unit 141; and appends a third process ID and the version number to the results data of the third user defined process and sends it to the output alignment unit 141.

The output alignment unit 141 inputs a set of the results data of the second user defined process, the second process ID and the version number (hereinafter, a set of information including the results data, the process ID and the version number is referred to as "a set of the results data") and a set of the results data including the results data of the third user defined process, the third process ID and the version number. And the output alignment unit 141 decides output order to device exterior or propriety of output, and outputs to device exterior.

The processing control units 111 and the output connection units 131 are made to correspond to the processing unit 121-1 and the processing unit 121-2, and exist in plural. However, since the processing unit 121-2 is not equipped with a function to start or to stop process, a function to order to start or to stop process to the processing unit 121-2 is not indispensable in the processing control unit 111.

Further, the processing unit 121-2 may, same as the processing unit 121-1, be equipped with the function to output the notification of process completed, the function to stop process, the function to change the process to execute and the function to start process. In this case, the processing unit 121-2 is equipped with the same construction as the processing unit 121-1. And being made to correspond to each of the processing unit 121-1 and the processing unit 121-2, the processing control unit 111 and the output connection unit 131 with the identical function are equipped. When there is no need to distinguish the contents to be processed, or when applicable to both of the first processing unit 121-1 and the second processing unit 121-2, they are simply transcribed as "a processing unit 121". In each of the processing unit 121, an identification number for identifying each is set.

The time series data processing device 100 operates roughly as follows. That is, the first processing unit 121-1 inputs data, executes the first user defined process and outputs results data to the output connection unit 131. The second processing unit 121-2 inputs data, executes the second user defined process and outputs results data to the output connection unit 131.

The first processing unit 121-1 outputs the notification of process completed that shows it is in the status that the first process is completed to the status management unit 101.

The status management unit 101 inputs the notification of process completed, and records that, in the first processing unit 121-1, the process is completed. When being in the status that the first user defined process is completed, the status management unit 101 outputs the order to stop sequence.

The processing control unit 111 inputs the order to stop sequence, stops the first user defined process by the first processing unit 121-1 and outputs the order to interrupt output. At that time, the output connection unit 131 inputs the order to interrupt output and interrupts transmission of the results data from the first user defined process.

Also, the status management unit 101 records the process ID and the version number of the second user defined process and the third user defined process in the information management unit 142. And the status management unit 101 instructs to start reconstruction to the first processing unit 121-1.

The reconstruction unit 122 inputs the order to reconstruct. And the reconstruction unit 122 carries out reconstruction that writes the third user defined process in the first processing unit 121-1, and outputs the notification of reconstruction completed.

When the notification of reconstruction completed is inputted, the status management unit 101 records that reconstruction of the first processing unit 121-1 is completed and outputs the order to start sequence of the third user defined process reconstructed in the first processing unit 121-1.

The processing control unit 111 inputs the order to start sequence and starts the third user defined process by the first processing unit. And when successful start is confirmed, the processing control unit 111 outputs the order to connect output.

When the order to connect output is inputted, the output connection unit 131 starts to transmit the results data of the third user defined process to the output alignment unit 141.

The first processing unit 121-1 inputs data, executes the third user defined process and outputs results data to the output connection unit 131.

The information management unit 142 appends the second process ID and the version number to the results data of the second user defined process, appends the third process ID and the version number to the results data of the third user defined process, and outputs to the output alignment unit 141.

The output alignment unit 141 inputs the set of the results data including the results data of the second user defined process and the set of the results data including the results data of the third user defined process. And the output alignment unit 141 decides output order to device exterior or propriety of output, and outputs the set of the results data to device exterior.

Figure 3:
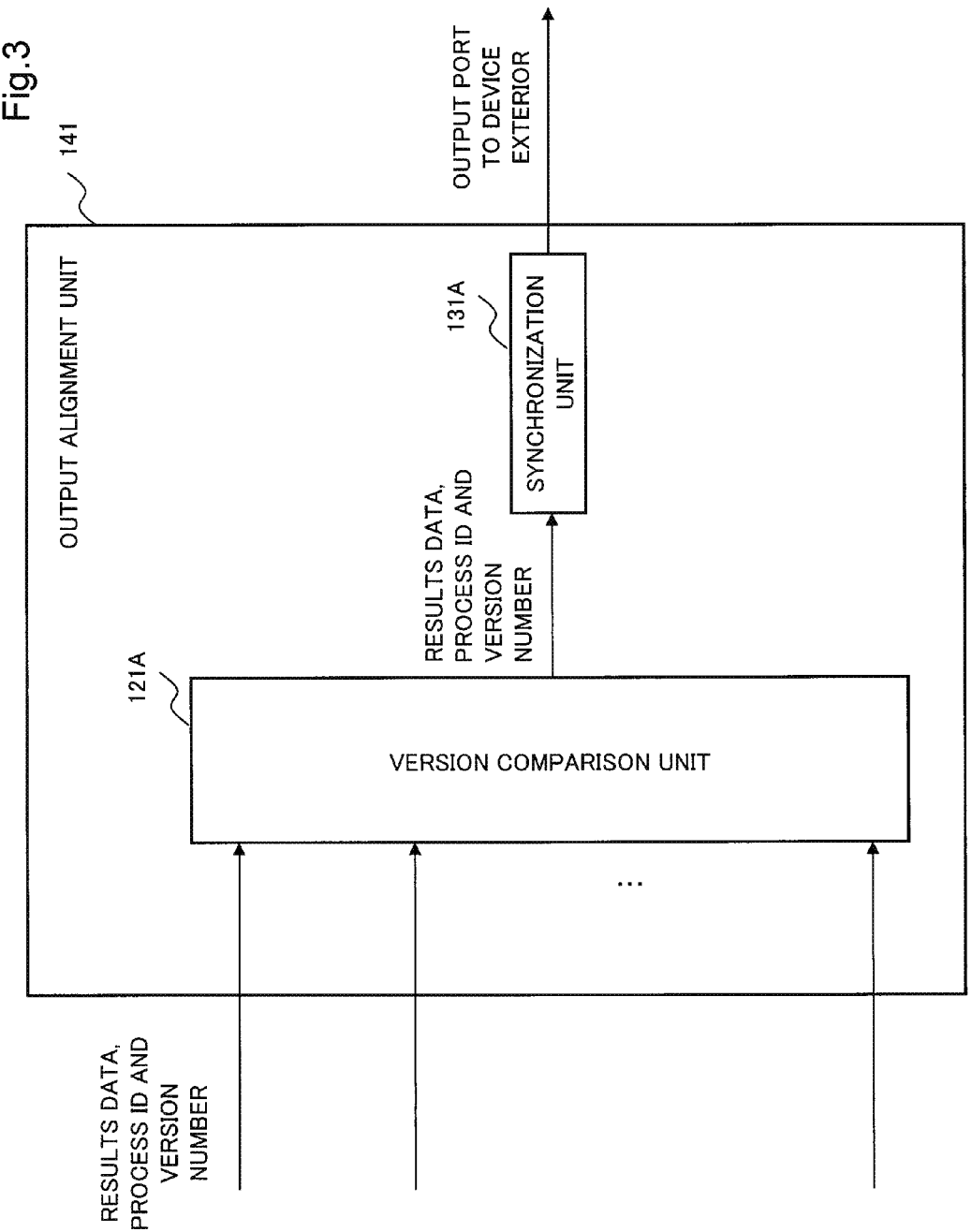
FIG. 3 A block diagram showing details of an output alignment unit 141.

FIG. 3 is a figure showing details of the output alignment unit 141 shown in FIG. 2. The output alignment unit 141 is equipped with a version comparison unit 121A and a synchronization unit 131A.

The version comparison unit 121A inputs the set of the results data. And among the sets of the results data that arrived simultaneously and have the same process ID, one having the older version number is discarded and the remaining sets of the results data are outputted to the synchronization unit 131A.

The synchronization unit 131A inputs the sets of the results data from the comparison unit 121A. And the synchronization unit 131A discards the set of the results data having the version number older than the value recorded in the synchronization unit 131A for each process ID, and outputs the set of the results data other than that to the output port to device exterior. When the set of the results data is outputted, the synchronization unit 131A updates the version number registered in the synchronization unit 131 to the version number that was appended to the set of the results data outputted.

Figure 4:
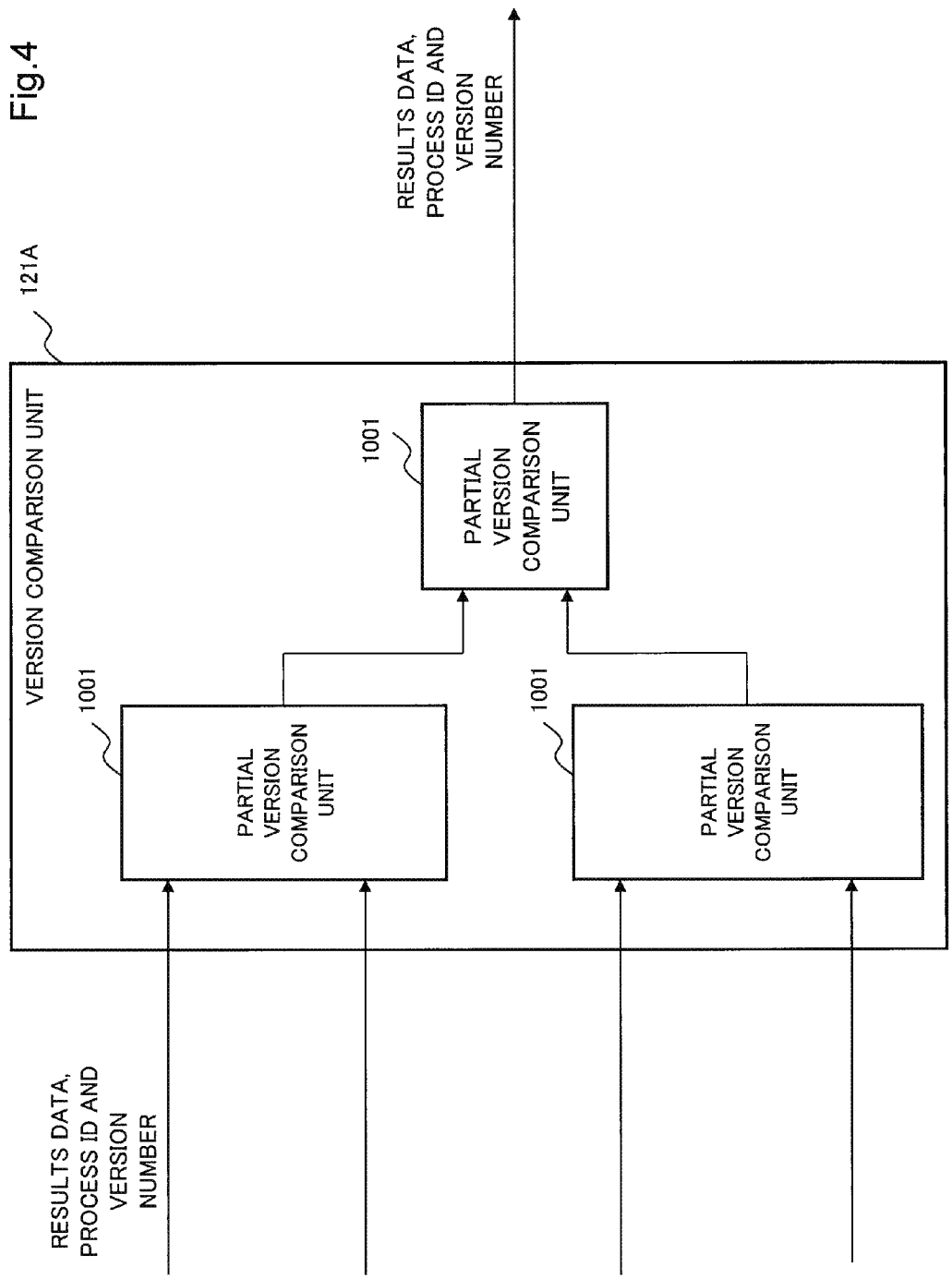
FIG. 4 A block diagram showing a first example of implementation of a version comparison unit 121.

FIG. 4 is a block diagram showing a first example of implementation of the version comparison unit 121. The version comparison unit 121A corresponds to the time series data processing unit equipped with the four processing units 101 and receives four sets of the set of the results data. The version comparison unit 121A is equipped with three partial version comparison units 1001. When two sets of the set of the results data have arrived simultaneously, each of the three partial version comparison units 1001 discards, among those having the same process ID, the set of the results data to which the older version number is appended, and outputs the other set of the results data to the output port.

Figure 5:
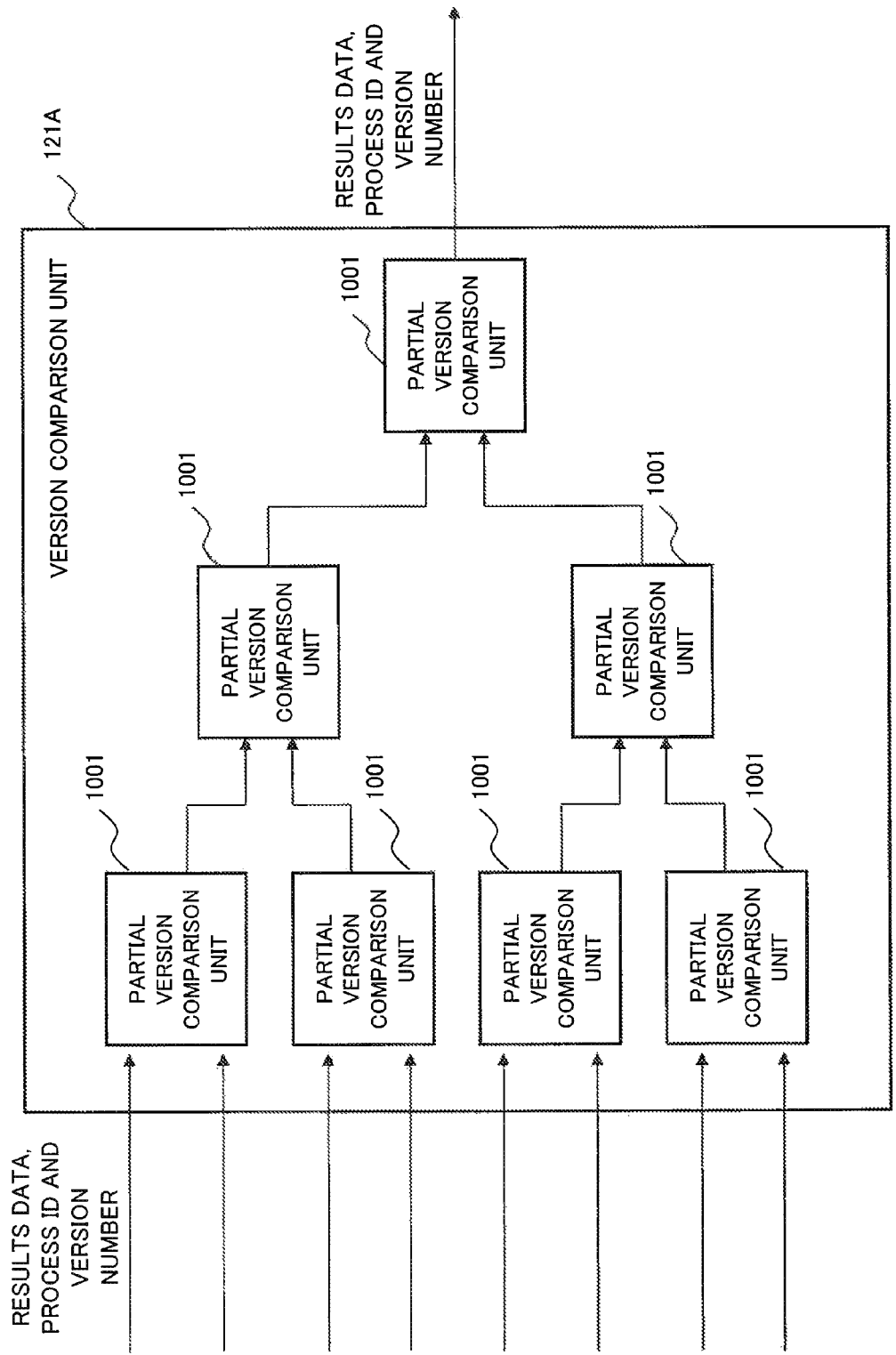
FIG. 5 A block diagram showing a second example of implementation of a version comparison unit 121.

FIG. 5 is a block diagram showing a second example of implementation of the version comparison unit 121. The version comparison unit 121A corresponds to the time series data processing unit equipped with the eight processing units 101 and receives eight sets of the set of the results data. The version comparison unit 121 is equipped with the seven partial version comparison units 1001. Same as in FIGS. 4 and 5, by installing the partial version comparison units, the version comparison unit 121A having arbitrary number of input can be constructed.

Figure 6:
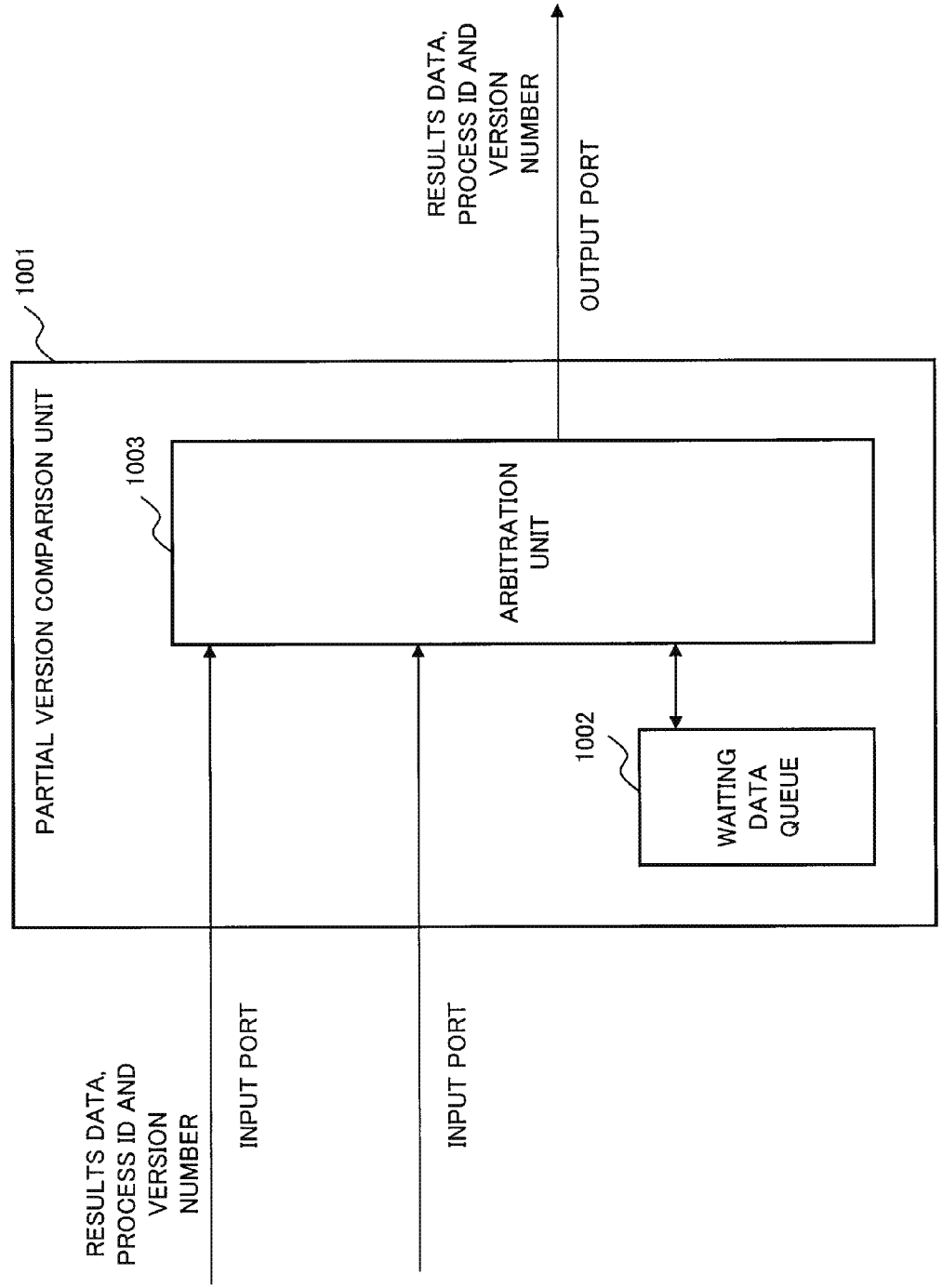
FIG. 6 A block diagram showing an example of implementation of a partial version comparison unit 1001.
Figure 7:
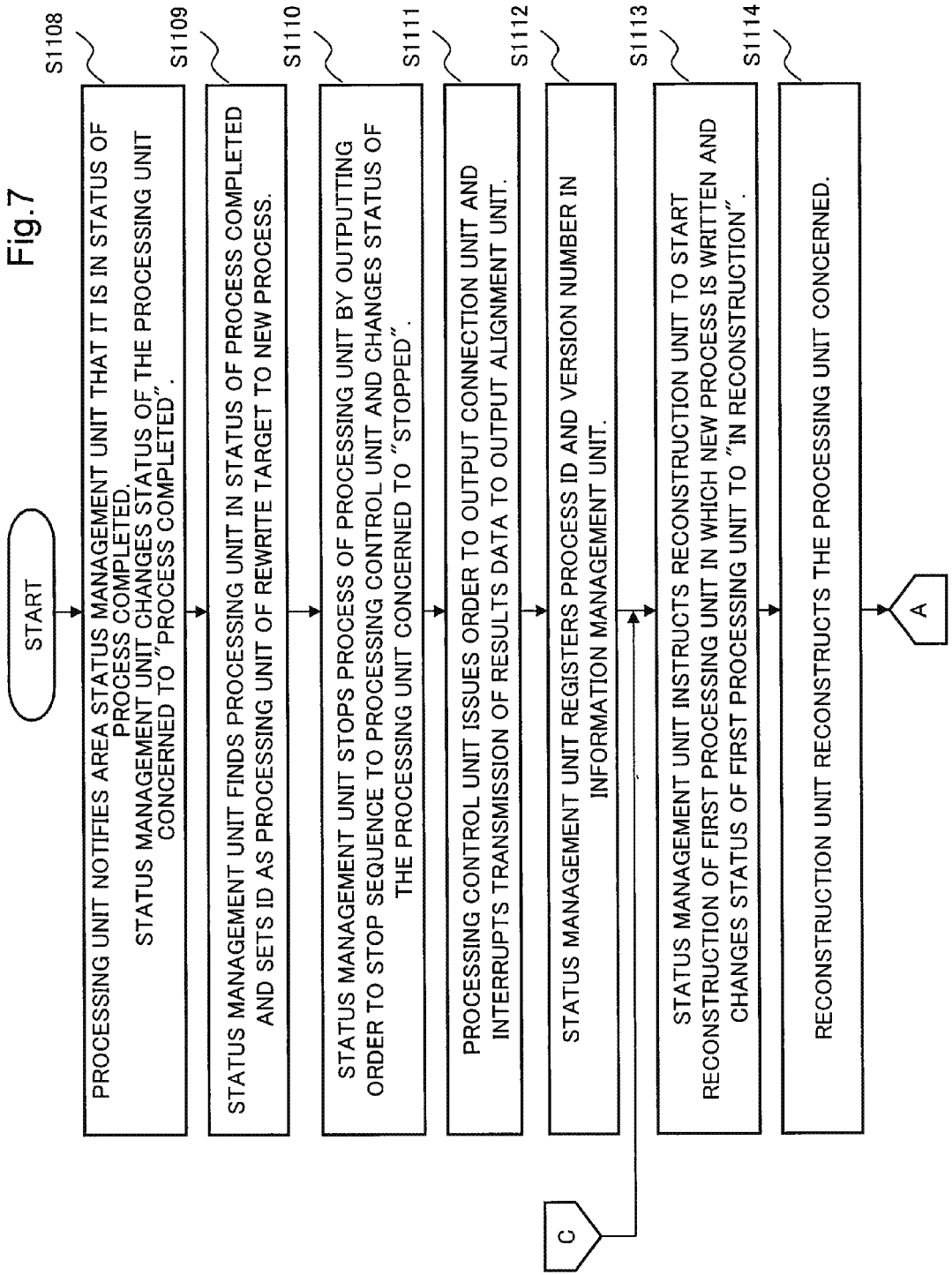
FIG. 7 A flow chart showing a process example in a time series data processing device of an exemplary embodiment of the present invention.
Figure 8:
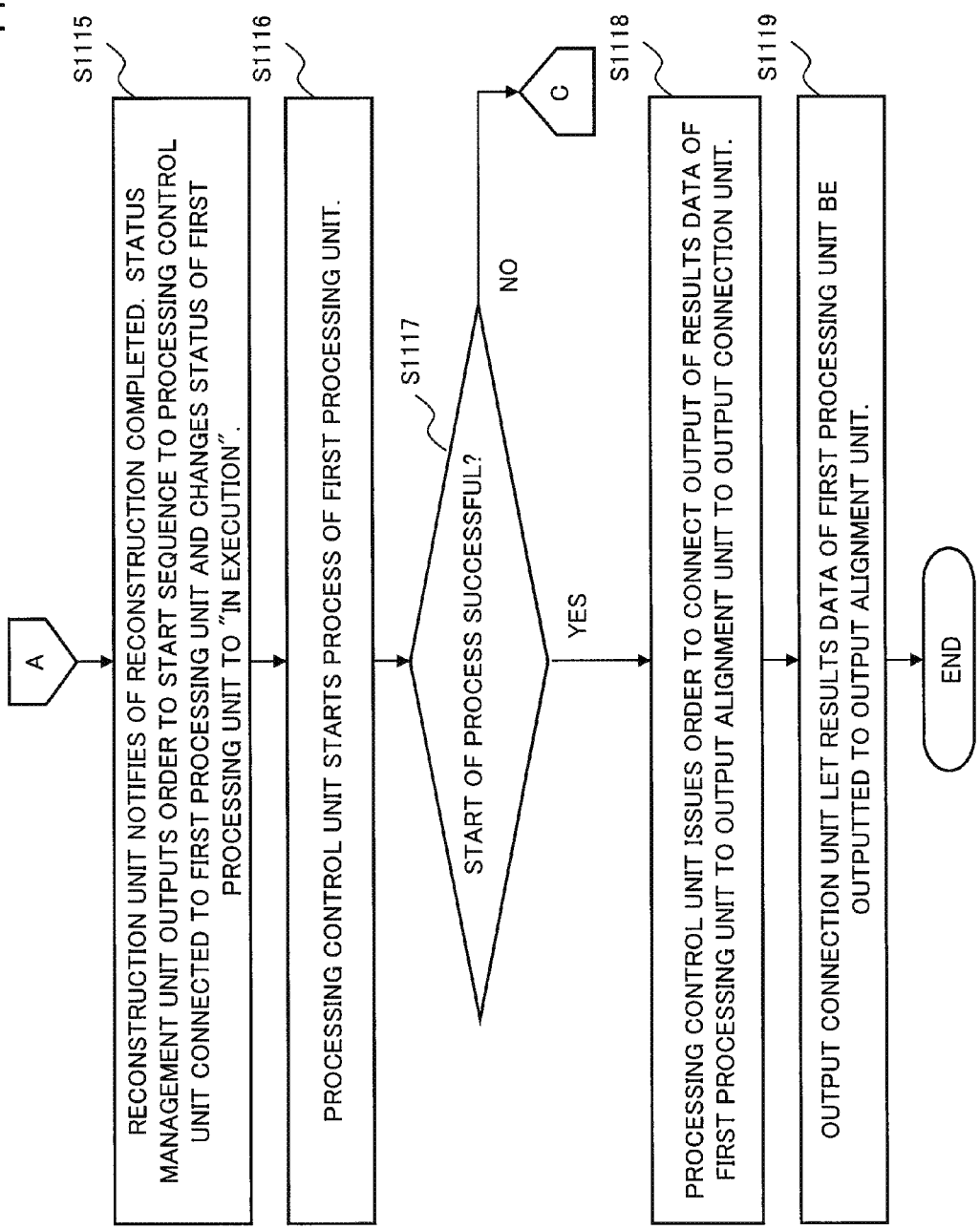
FIG. 8 A flow chart showing a process example in a time series data processing device of an exemplary embodiment of the present invention.

FIG. 6 is a block diagram showing an example of implementation of the partial version comparison unit 1001. The partial version comparison unit 1001 may be implemented by a construction having an input port, an output port, a waiting data queue 1002 and an arbitration unit 1003. The partial version comparison unit 1001 arbitrates allocation of the output port about the sets of the results data received from the two input ports and the waiting data queue 1002 using the arbitration unit 1003. The set of the results data to which the output port was allocated is outputted to the output port. The set of the results data to which the output port was not allocated is discarded or inserted in the waiting data queue 1002. The data inserted in the waiting data queue 1002 will be the input to the partial version comparison unit 1001 again in the following cycle.

Explanation of operation afterwards will be carried out only for a case when the version comparison unit 121A is constructed from one partial version comparison unit 1001. The operation of the version comparison unit 121A explained can also be applied to the version comparison unit 121A equipped with no smaller than two partial version comparison units 1001 easily.

Next, before explaining the operation of the time series data processing device 100 according to this exemplary embodiment, several technical terms will be defined.

A period of time after new input arrives and until the next input comes is called "1 input period of time". A cycle of a clock that defines a unit time necessary for the time series data processing device to complete predetermined operation is called "1 cycle".

As described above, divisions in which a circuit that can execute a process can be written are supposed to exist in plural on the device, and these divisions are called "the partitions". By sending setting information called construction data or configuration data to the partitions, circuits that execute the user defined process can be generated.

"To order", "to instruct" and "to notify" mean that a certain part (referred to as "an order source part") operates a signal of wiring connected to a different part (referred to as "an order destination part") or writes a value in a storage device that exists in the order destination part. "To register" and "to set" mean that a certain part of a registration source writes a value in a storage device that exists in a different part of a registration destination. "To send information", "to send data" and "to output results." mean that a certain part of a device that is a sending source operates a signal of wiring that is connected to a different part of the device that is a sending destination, or writes a value in a storage device that exists in a part of the sending destination.

The version number may be expressed by an integer. Or, a residue system of M may be used. Also, "a version number newer by "1"" means, in case an integer is used for the version number and for an integer N that is the old version number, a value of (N+1). Or, "a version number newer by "1"" means, in case the residue system of M is used for the version number and for a residue of an integer N divided by M that is the old version number, a residue of (N+1) divided by M. "A version number older by "1"" means, in case an integer is used for the version number and for an integer N that is the new version number, a value of (N−1). Or, "a version number older by "1"" means, in case the residue system of M is used for the version number and for a residue of an integer N divided by M that is the new version number, a residue of (N−1) divided by M. For example, using the residue system of 3, a value newer than "0" by "1" may be expressed as "1", a value newer than "1" by "1" as "2", a value newer than "2" by "0" as "0", a value older than "2" by "1" as "1", a value older than "1" by "1" as "0", and a value older than "0" by "1" as "2".

The process ID is used, in such a case as change from the first old process to the first new process and change from the second old process to the second new process are progressing simultaneously, in order to distinguish pairs of the old process and the new process.

By the way, in this exemplary embodiment, the results data that is outputted from the time series data processing device 100 is changed from the one by the old process to the one by the new process. This change is enabled by an instruction to change the process (hereinafter, referred to as "an instruction to change process") to the time series data processing device 100 by a host computer and so on that is not illustrated. In the following explanation, it is assumed that the time series data processing device 100 has already received the instruction to change process.

Operation of the time series data processing device 100 according to this exemplary embodiment will be explained with reference to FIG. 7 to FIG. 11.

First, in the initial status, the first user defined process is executed in the first processing unit 121-1. The first user defined process is a process having no relation to the second user defined process (the old process) and the third user defined process (the new process).

Next, the second user defined process (the old process) is executed in the second processing unit 121-2. The old process is a process to be replaced next by the third user defined process (the new process). However, the process in the second processing unit 121-2 is not changed to the new process when the instruction to change process is received. The new process is executed instead of the first process after the first process is changed to the new process in the first processing unit 121-1. Execution of the old process in the second processing unit 121-2 continues, after receiving the instruction to change process, until at least the change of the process in the first processing unit 121-1.

Next, the first processing unit 121-1 notifies the status management unit 101 that the first user defined process executed in there is in the status that processing is completed.

The status management unit 101 records for a plurality of the processing units 121, the IDs and the status of the processes that operate in there. The status of the process may include: "process completed" that shows that the process is completed, "stopped" that shows it is stopped, "in operation" that shows it is in operation, and "in reconstruction" that shows reconstruction is in progress. The status management unit 101, upon receipt of this notification, changes the status of the processing unit 121 concerned to "process completed" (Step S1108). "Process completed" means either of the following four.

1) To be in the status that a predetermined process is completed and start of the next process is being waited for.
2) To be in the status that a predetermined process is completed and can be stopped.
3) To output the results data of the process to device exterior is not necessary any more.
4) Even if the process is stopped, harmful effect will not reach device exterior.
5) Such as the process status and the process results satisfy certain conditions.

Further, the user defined process may switch to the status of in execution again from the status of process completed.

Next, the status management unit 101 sets the identification number of the processing unit 121 that is a target to be changed to the new process. That is, the status management unit 101 finds the processing unit 121 that is in the status of process completed and accordingly, of which the process can be changed to the new process, and sets the identification number of the processing unit 121 (Step S1109). Here, the processing unit 121 of which the process content is changed to the new process is the first processing unit 121-1.

Since in the following steps, the status is changed or operation is carried out concerning the first processing unit 121-1, the identification number of the first processing unit 121-1 is stored. Also, setting of the identification number of the first processing unit 121-1 that is changed to the new process may be carried out following the input to the status management unit 101. For example, a host computer that is not illustrated may input the identification number of the first processing unit 121-1 to the status management unit 101.

Next, the status management unit 101 outputs to the processing control unit 111 the order to stop sequence that is the order to stop the process operating in the first processing unit 121 that is changed to the new process.

When the order to stop is inputted, the processing control unit 111 stops the first process in the first processing unit 121-1. Also, the status management unit 101 changes the status of the first processing unit 121-1 to "stopped" (Step S1110). To stop the process may be carried out by operating a reset signal for the process that operates in the processing unit 121.

Next, the processing control unit 111 issues the order to the output connection unit 131 that is connected to the first processing unit 121-1 designated in Step S1110 and interrupts transmission of the results data from the first processing unit 121-1 to the output alignment unit 141 (Step S1111). Interruption of transmission may be carried out by installing a signal that shows validity or invalidity of the results data that the output connection unit 131 outputs to the output alignment unit 141, and by operating the signal.

Next, the status management unit 101 registers the process ID and the version number in the information management unit 142 (Step S1112). The process ID and the version number are used, when the old process is changed to the new process, to align order of output of the results data of the old process and the new process to device exterior, or which of them to output to device exterior. The information management unit 142 records the process ID and the version number for the respective processing units 121.

Meaning of "to align" will be explained. In the following, that the processing unit 121 completes the process and outputs the results data is called "to generate the results data". Also, that the output alignment unit 141 outputs the results data to device exterior is called "to output the results data".

In this exemplary embodiment, while execution of the old process in the second processing unit 121-2 is continued, the process in the first processing unit 121-1 is changed to the new process. Therefore, the new and the old process operates in parallel temporarily, and the results data of the new process (hereinafter, referred to as "the new process results data") and the results data of the old process (hereinafter, referred to as "the old process results data") exist in the time series data processing device simultaneously. Therefore, output order of the results data to device exterior or which results data to output to device exterior needs to be decided. "To align" means to carry out control of relation between generation order and output order of the new process results data and the old process results data that exist in the time series data processing device simultaneously, and selection of the results data that is made the output target on the basis of the time when the new process results data was generated.

Specifically, the first meaning of "to align" is to decide output order of the results data so that order of the time when each of the new process results data and the old process results data was generated and order of the results data outputted to exterior of the time series data processing device may be identical. That is, to decide output order of the results data so that before and after relation between the generation time of the new process results data and the generation time of the old process results data and before and after relation between output time of the new process results data to exterior and output time of the old process results data to exterior may become identical is called "to align". For example, it is supposed that the results data generated first after the new process is started is N1 and the time when the results data was generated is T1. Order is decided so that the results generated by the old process before T1 are outputted to device exterior before N1.

The second meaning of "to align" means to decide which of the new process results data or the old process results data to output to device exterior so that the old process results data that was generated after the time when the new process was started and the first new process results data was generated is not outputted. That is, to make the old process results data generated at the time before the generation time of the first new process results data to be outputted to outside, and the old process results data generated at the time after the generation time of the new process results data not to be outputted to exterior is called "to align".

Further, the time when the results data is outputted is after the time when it was generated, and both of them are not identical. As mentioned above, to output the old process results data or not is decided to the utmost by the relation between the time when it was generated and the time when the new process results data was generated first. For example, it is supposed that the results generated first after the new process was started are N1 and the time when the results were generated is T1. The results generated by the old process before T1 are made to be outputted to device exterior, and the results generated by the old process after T1 are not made to be outputted to device exterior.

Next, a method to align will be explained. When a certain process unit 121 generates results data, the processing unit 121 outputs the identification number of the processing unit 121 and generation timing information of the results data together with the results data. By referring to the identification information and the generation timing information of the processing unit 121, control of output order to device exterior and propriety of output to device exterior are decided.

For example, as the identification information of the first processing unit 121-1 and the second processing unit 121-2, the process ID and the version number can be used. At this time, by allocating a set of the information including the same process ID and the different version numbers as the respective identification information of the first processing unit 121-1 and the second processing unit 121-2, the process to align can be carried out. More specifically, the same value as the process ID of the old process results data is set to the process ID of the new process results data, and the version number of the results data of the new process is set to a value newer than the version number of the results data of the old process by "1".

For example, the process ID of the results data of the old process is set to "0" and the version number to "1", and the process ID of the results data of the new process is set to "0" and the version number to "2". And among the results data that exists in the output alignment unit 141 simultaneously, operation is carried out so that, for the pair of the results data of which the process IDs are the same, only those of which the version number is newer by "1" remain. As a result, operation to align that is to output only the results data of the new process to device exterior becomes possible.

Next, the status management unit 101 instructs the reconstruction unit 122 to start reconstruction of the first processing unit 121-1 to be changed to the new process. The status management unit 101 changes the status of the first processing unit 121-1 to "in reconstruction" (Step S1113).

Next, the reconstruction unit 122 reconstructs the first processing unit 121-1 designated in Step S1113 (Step 1114). Realization of reconstruction of the processing unit 121 may be carried out by using an FPGA and by inputting reconstruction data to a module set in the chip and for which reconstruction is carried out. The reconstruction information may be recorded in the reconstruction unit 122. Or, it may be inputted from the status management unit 101. Or, it may be inputted from the host computer that is not illustrated.

Next, the reconstruction unit 122 notifies of reconstruction completed. The status management unit 101 inputs the notification of reconstruction completed from the reconstruction unit 122 and outputs the order to start sequence to the processing control unit 111-1 connected to the first processing unit 121-1 designated in Step S1113. The status management unit 101 changes the status of the first processing unit 121-1 to "in execution" (Step S1115).

Output of the order to start sequence can be carried out as follows. That is, the status management unit 101 sets the identification number of the processing control unit 111-1 and the identification number of the first processing unit 121-1 to the identical number and records the identification number of the first processing unit 121-1. And the status management unit 101 refers to the identification number at the timing when the notification of reconstruction completed is inputted and makes a signal of the order to start sequence connected to the processing control unit 111-1 active.

Next, the processing control unit 111-1 designated in Step S1113 receives the order to start sequence and starts the process of the first processing unit 121-1 (Step S1116). This means to start operation of the third user defined process (the new process) in the first processing unit 121-1. Further, "process of a processing unit" means the process that is executed by the circuit reconstructed in the processing unit. "Start of a process" means to switch the process from a standby status to an operation status that outputs results data. The start of the process may be carried out by operating the reset signal for the process.

Next, the processing control unit 111-1 examines whether start of the third user defined process in the first processing unit 121-1 is successful (Step S1117). This is because there are cases when, due to the reasons such as setting of wrong or broken reconstruction data and failure of a procedure of reconstruction, the start of the process in the first processing unit 121-1 may fail. Success of the start of the process may be examined by whether a specific bit pattern is outputted from the process to the processing control unit 111. In case the start of the process is successful, step proceeds to Step S1118, and in case failed, step returns to Step S1113.

Next, the processing control unit 111-1 designated in Step S1113 outputs the order to connect output of the results data of the third user defined process that the first processing unit 121-1 generated to the output connection unit 131-1 (Step S1118).

Next, the output connection unit 131-1 inputs the order to connect output and connects the first processing units 121-1 and the output alignment unit 141 so that the results data of the third user defined process from the first processing unit 121-1 may be outputted to device exterior (Step S1119). Connection of the first processing units 121-1 and the output alignment unit 141 may be carried out by operating the signal that shows validity or invalidity of the results data that the output connection unit 131-1 outputs to the output alignment unit 141.

Figure 9:
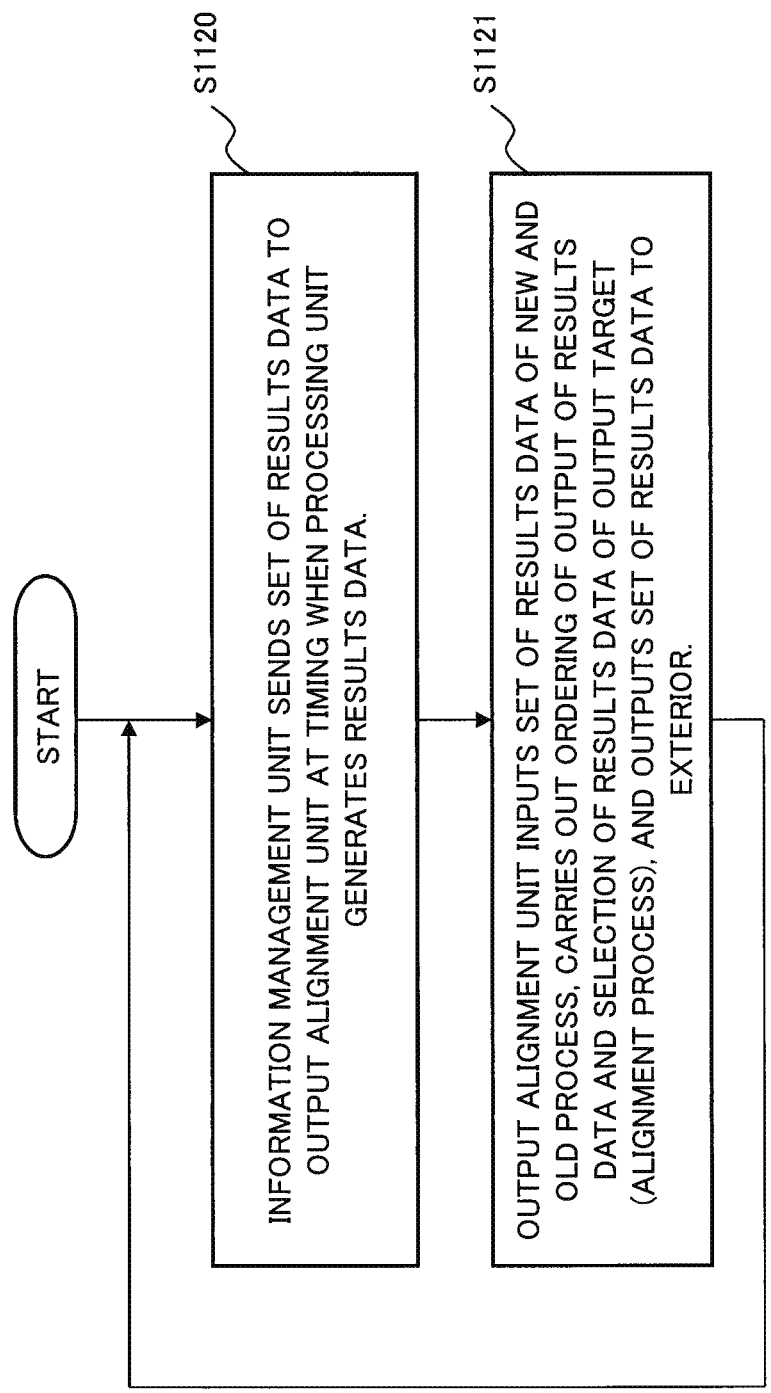
FIG. 9 A flow chart showing a process example in a time series data processing device of an exemplary embodiment of the present invention.
Figure 12:
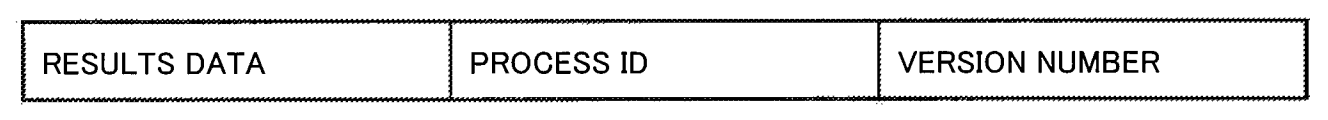

In parallel to the steps above, the following steps shown in FIG. 9 are executed. That is, the information management unit 142 outputs, at the timing when the second processing unit 121-2 generates the results data of the second process, the registered process ID and the version number of the second processing unit 121-2 together with the results data to the output alignment unit 141 (Step S1120). As a result, input information to the output alignment unit 141 will be a set of the results data. The set of the results data may also be, for example, data that takes a construction as shown in FIG. 12.

The output alignment unit 141 inputs the set of the results data including the results data of the second user defined process and the set of the results data including the results data of the third user defined process. And the output alignment unit 141 performs control of order of output of the results data outputted from a plurality of the processing units 121 to device exterior and selection of the set of the results data outputted to device exterior, that is, alignment. And the output alignment unit 141 outputs to device exterior the aligned sets of the results data of the new process or the old process in the aligned order and step returns to Step S1120 (Step S1121). Details of operation of steps S1120 and S1121 will be described later.

Figure 10:
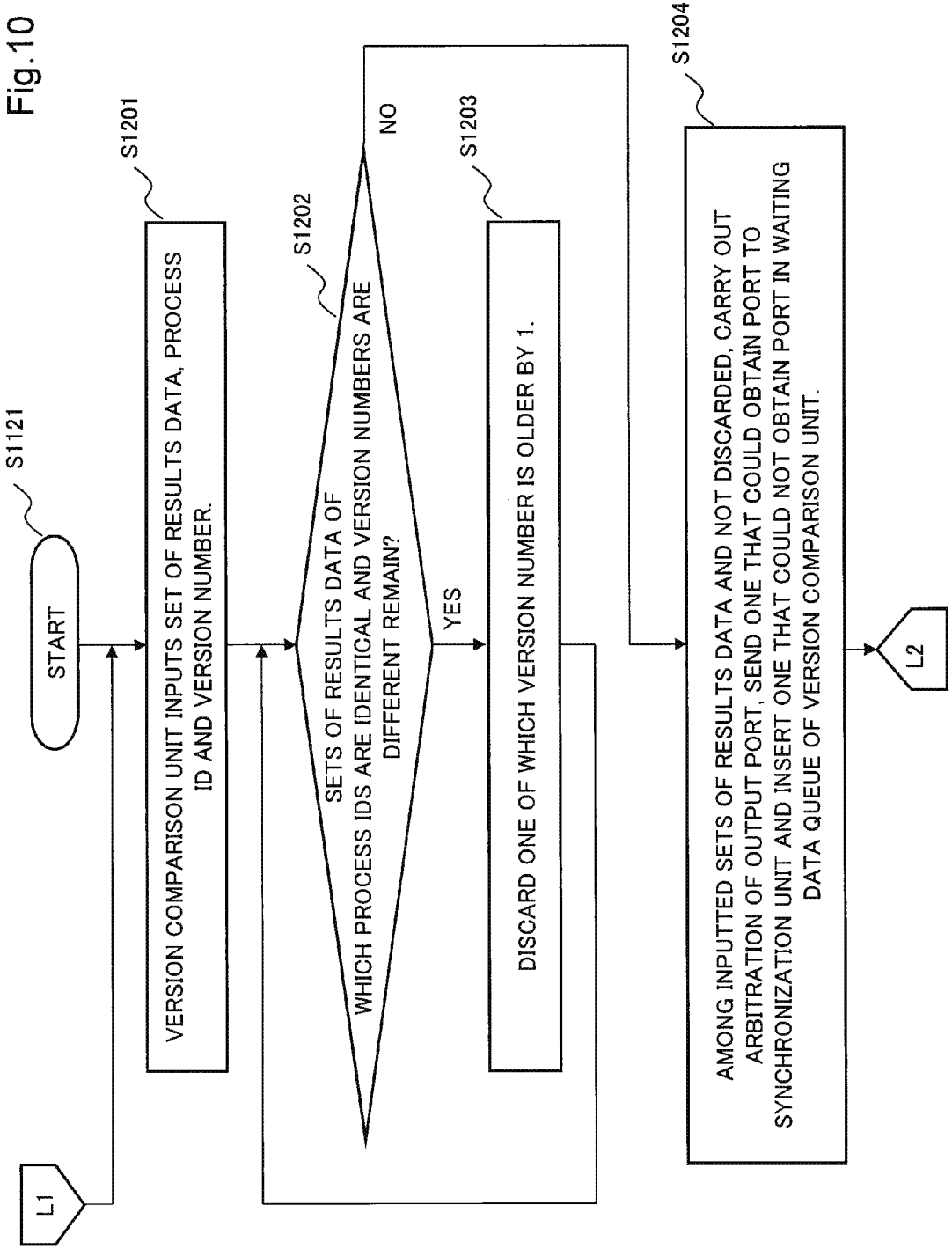
FIG. 10 A flow chart showing a process example in a time series data processing device of an exemplary embodiment of the present invention.
Figure 11:
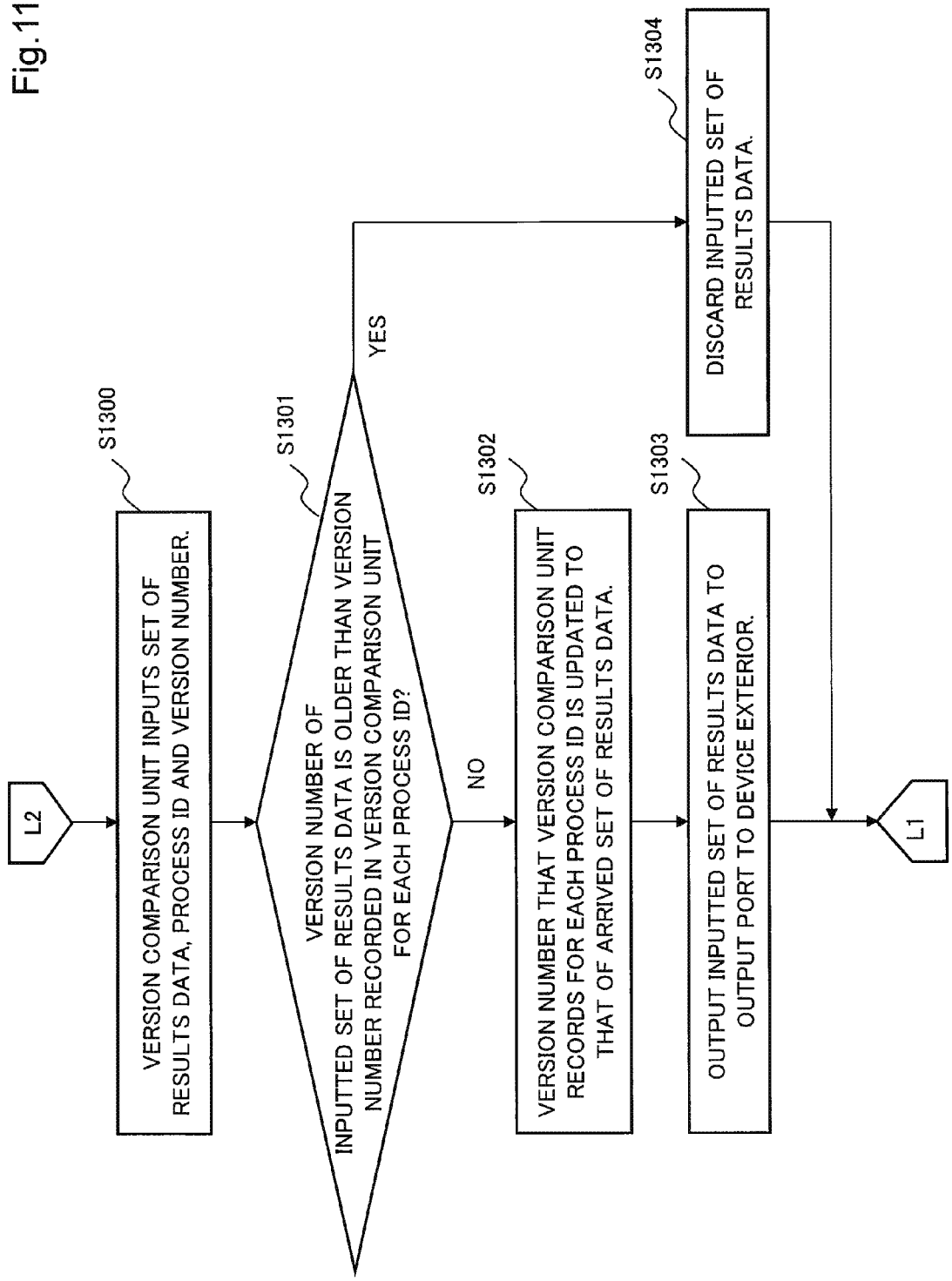
FIG. 11 A flow chart showing a process example in a time series data processing device of an exemplary embodiment of the present invention.

Next, Step S1121 mentioned above will be explained in detail with reference to FIG. 10 and FIG. 11.

First, the version comparison unit 121A inputs a set of the results data (Step S1201). Input at this time is carried out from the input port or the waiting data queue. The waiting data queue is a queue into which a set of the results data that was not discarded nor outputted in the version comparison unit 121 is inserted. The set of the results data stored in the waiting data queue is handled in the following cycle as input to the version comparison unit 121A.

The version comparison unit 121A examines, among the sets of the results data, whether there remains a pair in which the process IDs are identical and the version numbers are different (Step S1202). In case a plurality of sets of the results data are inputted simultaneously, the version comparison unit 121A examines among the sets of the results data inputted simultaneously. In case the pair in which the process IDs are identical and the version numbers are different remains, step proceeds to Step S1203. In case none remains, step proceeds to Step S1204.

The version comparison unit 121A discards the set of the results data of which the version number is older by "1" (Step S1203), and step returns to Step S1202.

The version comparison unit 121A, among the inputted sets of the results data, carries out arbitration of allocation of the output port among those not discarded, sends the set of the results data to which the port was allocated to the synchronization unit 131A, and inserts the set of the results data to which the port was not allocated in the waiting data queue 1002 of the version comparison unit 121A (Step S1204). The output port is a signal line of output from the version comparison unit 121A to the synchronization unit 131A. Arbitration of allocation of an output port is an act to select one data that can use the output port. At this time, for the selected data, it is said that "port is allocated" or "port is obtained".

Next, the synchronization unit 131A inputs the set of the results data (Step S1300). And the synchronization unit 131A examines whether the version number of the inputted set of the results data is older than the version number recorded in the synchronization unit 131A for each process ID (Step S1301). In case it is older, step proceeds to Step S1304, and in case not older, step proceeds to Step S1302.

The synchronization unit 131A updates the version number that the synchronization unit 131A records for each process ID to the one of the arrived set of the results data (Step 1302).

Next, the synchronization unit 131A outputs the inputted set of the results data to the output port to device exterior (Step 1303), and step returns to Step S1201.

In Step S1301, in case the version number of the inputted set of the results data is older than the version number recorded in the synchronization unit 131A for each process ID, the synchronization unit 131A discards the inputted set of the results data (Step S1304) and step returns to Step S1201.

Specific Example of Operation of the Exemplary Embodiment

A specific example of operation of the time series data processing device 100 according to the exemplary embodiment will be explained with reference to the flow charts of FIG. 7 to FIG. 11 and the block diagrams of FIG. 13 to FIG. 24.

A case is considered in which, for time series data given by an integer, a process (an old process) that outputs a value that added "1" is changed to a process (a new process) that outputs a value that added "2". In the second processing unit 121-2, a process before replacement, that is, the old process, is operating, and in the first processing unit 121-1, a process having no relation to the new or the old process is operating. And the process operating in the first processing unit 121-1 is stopped, the first processing unit 121-1 is reconstructed to the new process, and the new process is started.

Also, a cycle of a clock used for operation of the time series data processing device is called "a cycle", and it is used as a unit of a period of time. "Start time of cycle" means the first point of time of the period of time, and "end time of cycle" means the last point of time of the period of time. For example, in case a frequency of a clock is 1 GHz, concerning a certain reference time, the first cycle means a period of time between the reference time plus zero second and the reference time plus 1 nanosecond, and the N-th cycle means a period of time between the reference time plus (N−1) nanoseconds and the reference time plus N nanoseconds. Start time of the M-th cycle means the reference time plus (M−1) nanoseconds and end time of the M-th cycle means the reference time plus M nanoseconds. It is supposed that input data is given at each start time of cycle.

Also, in the status management unit 101, for the first processing unit 121-1 and the second processing unit 121-2, in execution is registered for both of them. Also, in the information management unit 142, for the first processing unit 121-1, "10" is registered as the process ID, "0" as the version number, and for the second processing unit 121-2, "20" is registered as the process ID, "0" as the version number.

Figure 13:
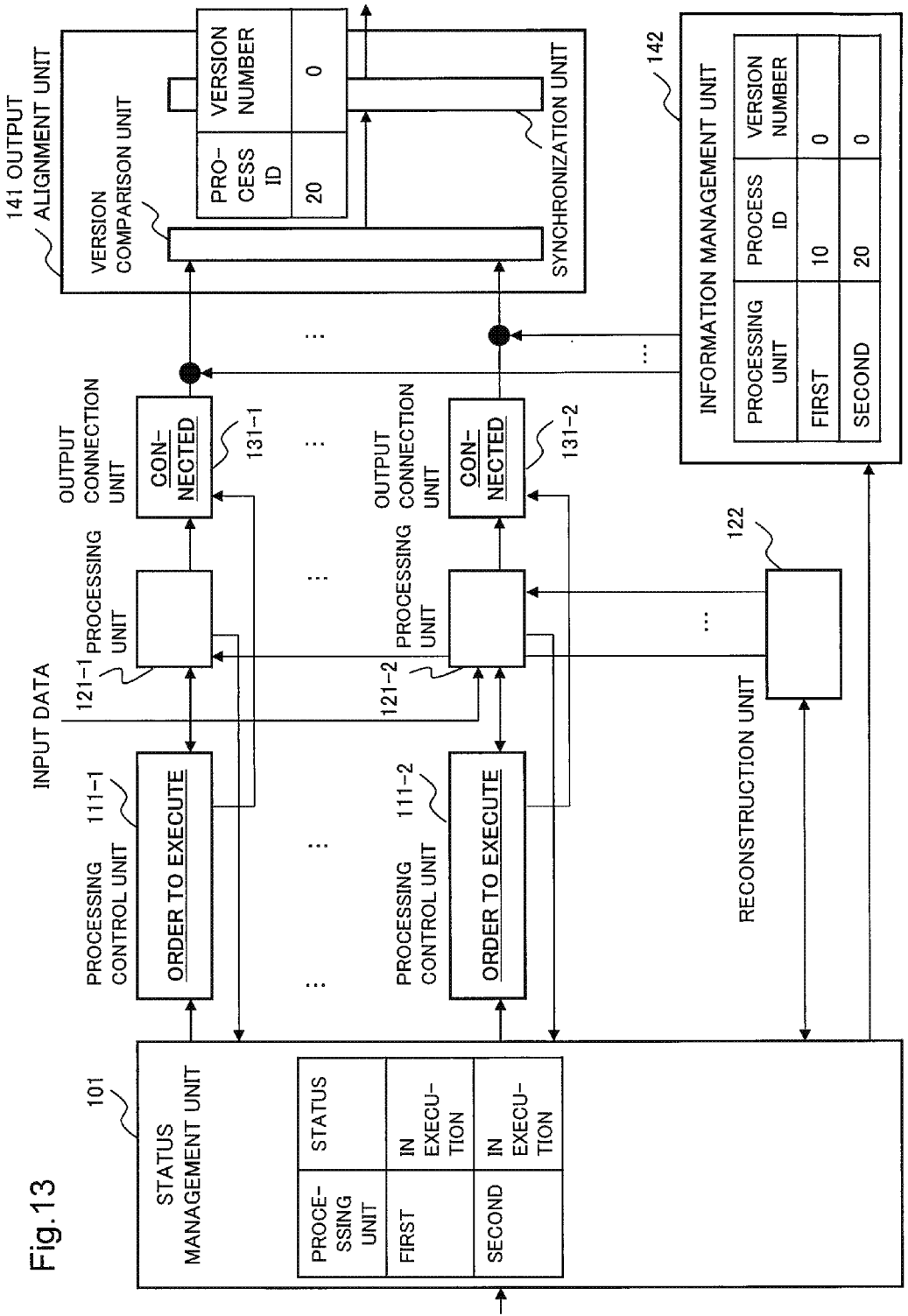
FIG. 13 A figure showing a status in each unit at end time of the x-th cycle of a specific example of operation of an exemplary embodiment of the present invention.

At this point of time, each part of the device will be in the status as shown in FIG. 13. In FIG. 13, "order to execute" means that the processing control unit 111 starts and makes execute the process that the circuit constructed in the processing unit 121 can execute. "Connected" means that the output connection unit 131 transmits the results data that the processing unit 121 generated to the output alignment unit 141.

At start time of the first cycle, input data "1" is given to the second processing unit 121-2 and the second processing unit 121-2 generates results data "2". This results data "2" is outputted to the output alignment unit 141 via the output connection unit 131-2. These processes are completed within 1 cycle.

At the same time, the information management unit 142 outputs "20" as the process ID and "0" as the version number to the output alignment unit 141 (Step S1120). As a result, at end time of this cycle, the output connection unit 131 and the information management unit 142 output the set of the results data, the process ID and the version number to the output alignment unit 141. This set of the results data is expressed as <2, 20, 0>.

From the start time of the first cycle, the first processing unit 121-1 notifies the status management unit 101 that the first process being executed is in the status of being completed (Step S1108). The information management unit 101 inputs the notification and changes the status of the first processing unit 121-1 to "process completed". These processes are completed within 1 cycle.

Figure 14:
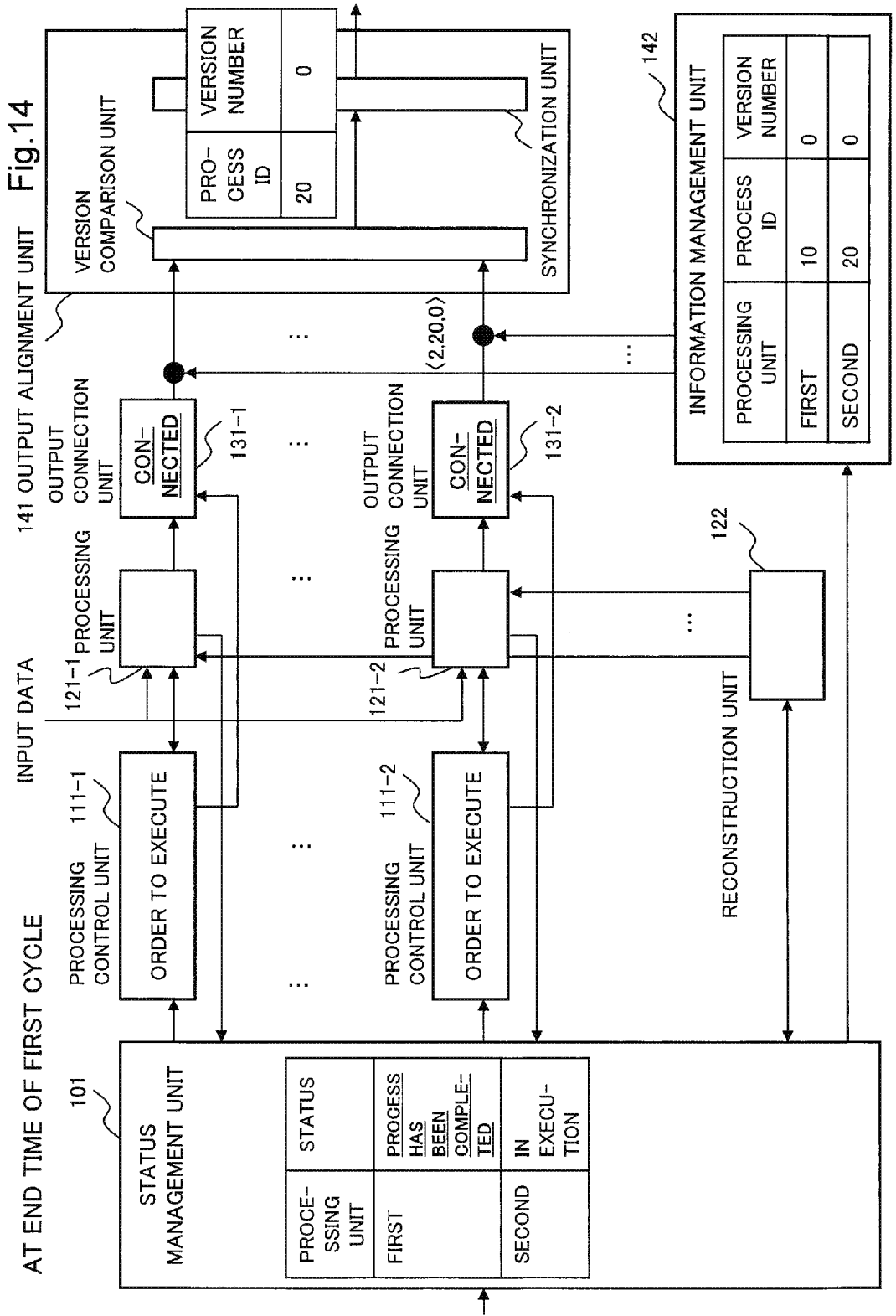
FIG. 14 A figure showing a status in each unit at end time of the first cycle of a specific example of operation of an exemplary embodiment of the present invention.

At end time of the first cycle, each part of the device will be in the status as shown in FIG. 14.

At start time of the second cycle, input data "2" is given to the second processing unit 121-2 and the second processing unit 121-2 generates results data "3". At end time of the second cycle, <3, 20, 0> is outputted to the output alignment unit 141. Also, the version comparison unit 121A inputs <2, 20, 0> at start time of the second cycle (Step S1201). At this time, since the sets of the results data of which the process IDs are identical and the version numbers are different do not exist, step proceeds to Step S1204 (Step S1202). Arbitration of allocation of the output port is carried out among the set of the results data, and since there exists only one set of the results data, the set of the results data mentioned above obtains the output port. And at end time of this cycle, this set of the results data is sent to the synchronization unit 131A (Step S1203).

From the start time of the second cycle, the status management unit 101 sets the identification number of the processing unit of target of which a process content is replaced to the new process. That is, the status management unit 101 finds a processing unit that is in the status of process completed and accordingly, that can be replaced to the new process, and sets the identification number of the processing unit (Step S1109). Here, it is set to write in the first processing unit 121-1. The status management unit 101 changes the status of the first processing unit 121-1 to "stopped".

Next, the status management unit 101 issues the order to the processing control unit 111-1 connected to the first processing unit 121-1, and the processing control unit 111-1 stops the process (Step S1110).

Next, the processing control unit 111-1 connected to the first processing unit issues the order to the output connection unit 131-1 and interrupts transmission of the results data to the output alignment unit 141 (Step S1111).

These processes are completed within 1 cycle.

Figure 15:
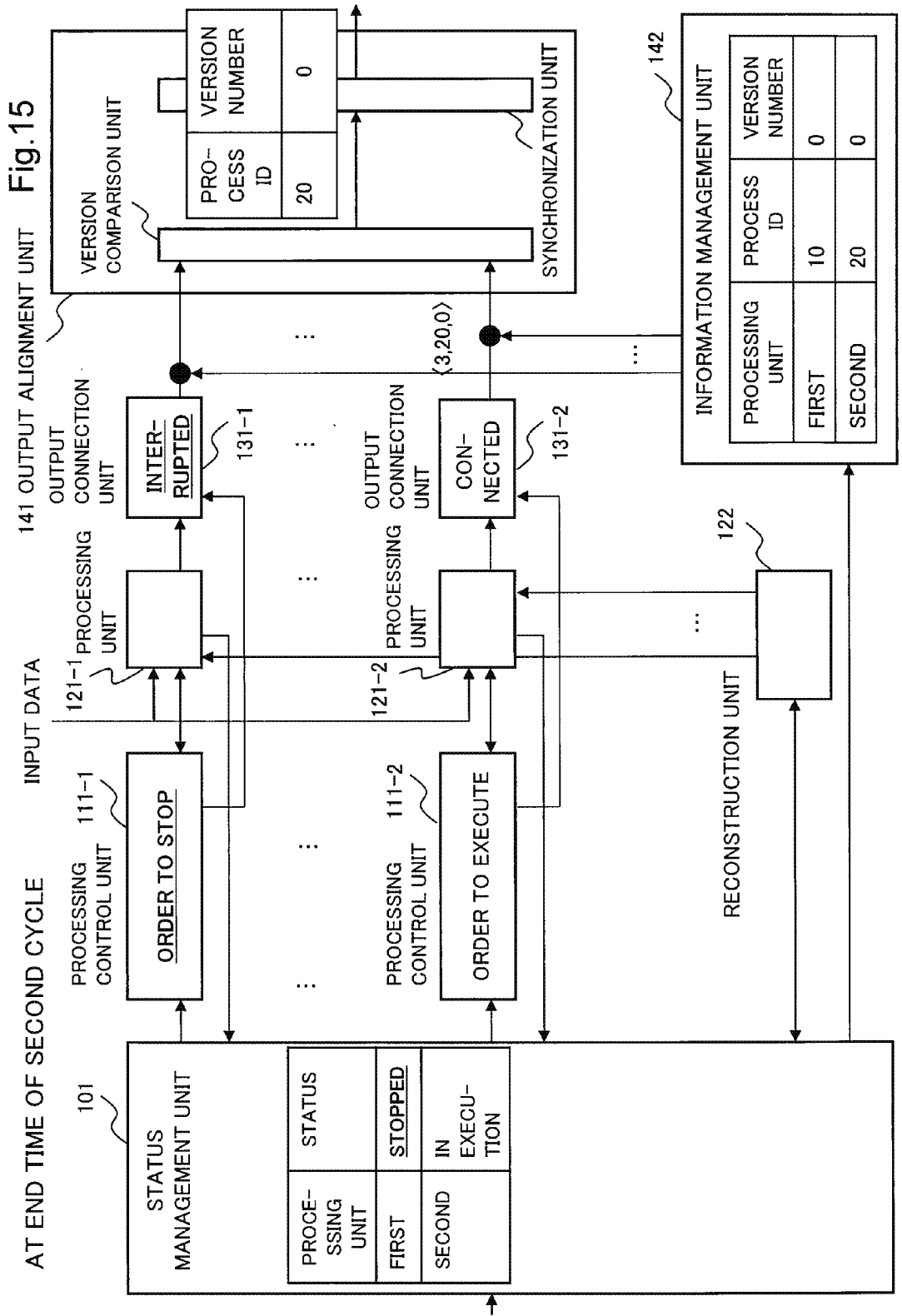
FIG. 15 A figure showing a status in each unit at end time of the second cycle of a specific example of operation of an exemplary embodiment of the present invention.

At end time of the second cycle, each part of the device will be in the status as shown in FIG. 15. In FIG. 15, "order to stop" means that the processing control unit 111-1 issues the order to stop to the process that operates in the first processing unit 121-1.

At start time of the third cycle, input data "3" is given to the second processing unit 121-2 and the second processing unit 121-2 generates results data "4", and at end time of the third cycle, <4, 20, 0> is outputted to the output alignment unit 141. Also, the version comparison unit 121A inputs <3, 20, 0> at start time of the third cycle, and sends this set of the results data to the synchronization unit 131A at end time of the third cycle. Also, the synchronization unit 131A inputs <2, 20, 0> at start time of the third cycle (Step S1300). Since the version number corresponding to the recorded process ID 20 is "0" and is identical with the one of the inputted set of the results data, step proceeds to Step S1302 (Step S1301). The recorded version number corresponding to the process ID 20 is updated (Step S1302), and at end time of the third cycle, the inputted set of the results data is outputted to the output port to device exterior (Step S1303).

From the start time of the third cycle, the management unit 101 registers the process ID and the version number of the first processing unit 121-1 in the information management unit 142 (Step S1112).

In this example, order of output to device exterior of the results data of the new and the old process and which one is outputted to device exterior is performed as follows. It is supposed that the results generated first after the new process is started are N1 and the time when the results were generated is T1. Order is decided so that the results generated by the old process before T1 may be outputted to device exterior before N1. Also the results generated by the old process after T1 are made not to be outputted to device exterior. Further, the results data from each of the new process and the old process is made to be outputted to device exterior in the order the results data is generated. In order to realize this, for the process ID that is given to the results data that the new process, that is, the first processing unit 121-1, generates, "20" that is the ID identical with the process ID of the old process is registered. And for the version number that is given to the results data that the new process, that is, the first processing unit 121-1, generates, a value newer than the old process by "1", that is, "1", is registered. These processes are completed within 1 cycle.

Figure 16:
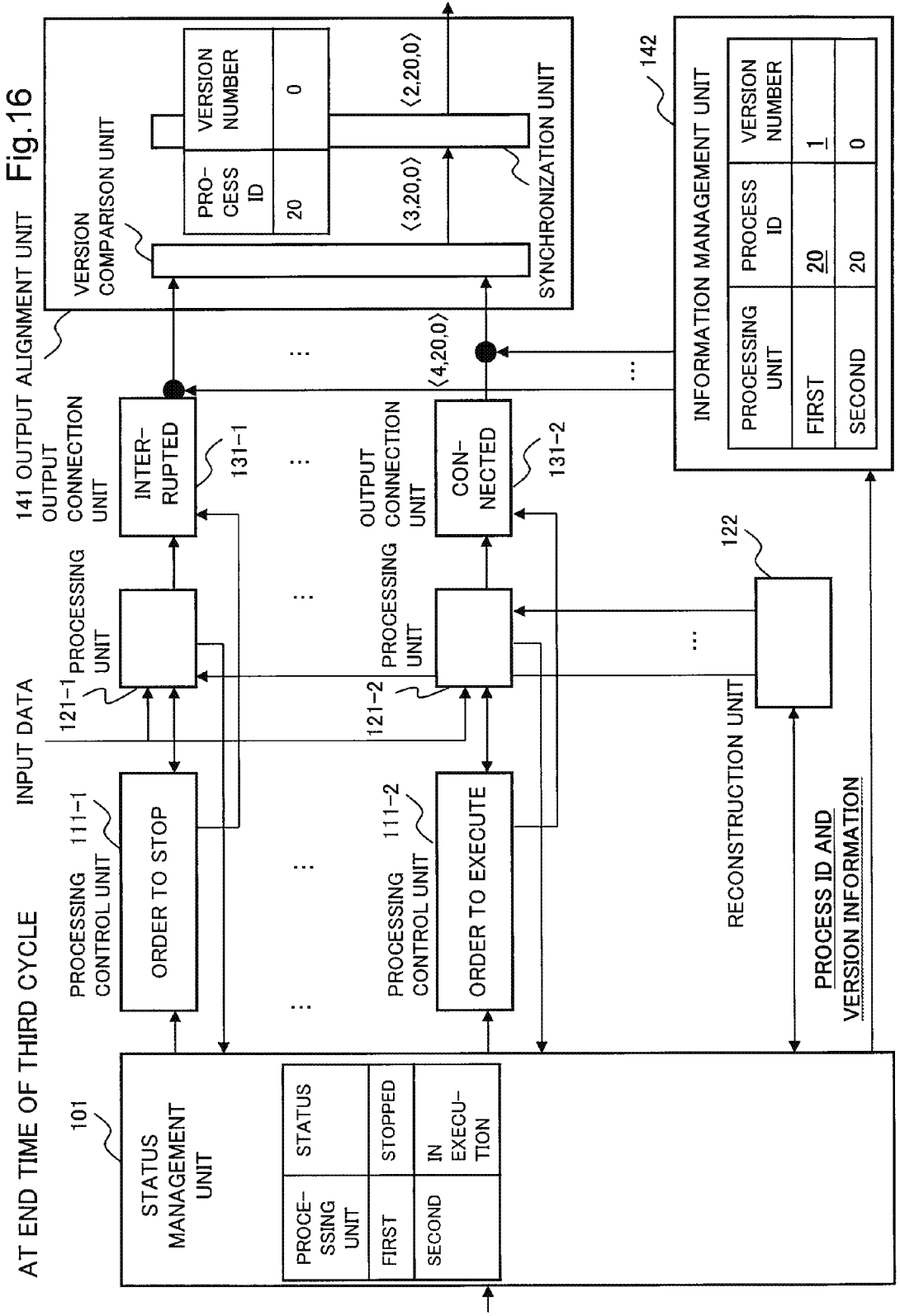
FIG. 16 A figure showing a status in each unit at end time of the third cycle of a specific example of operation of an exemplary embodiment of the present invention.

At end time of the third cycle, each part of the device will be in the status as shown in FIG. 16.

At start time of the fourth cycle, input data "4" is given to the second processing unit 121-2 and the second processing unit 121-2 generates results data "5", and at end time of the fourth cycle, <5, 20, 0> is outputted to the output alignment unit 141. Also, the version comparison unit 121A inputs <4, 20, 0> at start time of this cycle, and sends this set of the results data to the synchronization unit 131A at end time of the fourth cycle. Also, the synchronization unit 131A inputs <3, 20, 0> at start time of the fourth cycle, and outputs this set of the results data to the output port to device exterior at end time of the fourth cycle.

From the start time of the fourth cycle, the status management unit 101 instructs the reconstruction unit 122 to start reconstruction of the first processing unit 121-1 to which the new process is written (Step S1113). The status management unit 101 changes the status of the first processing unit to "in reconstruction". These processes are completed within 1 cycle.

Figure 17:
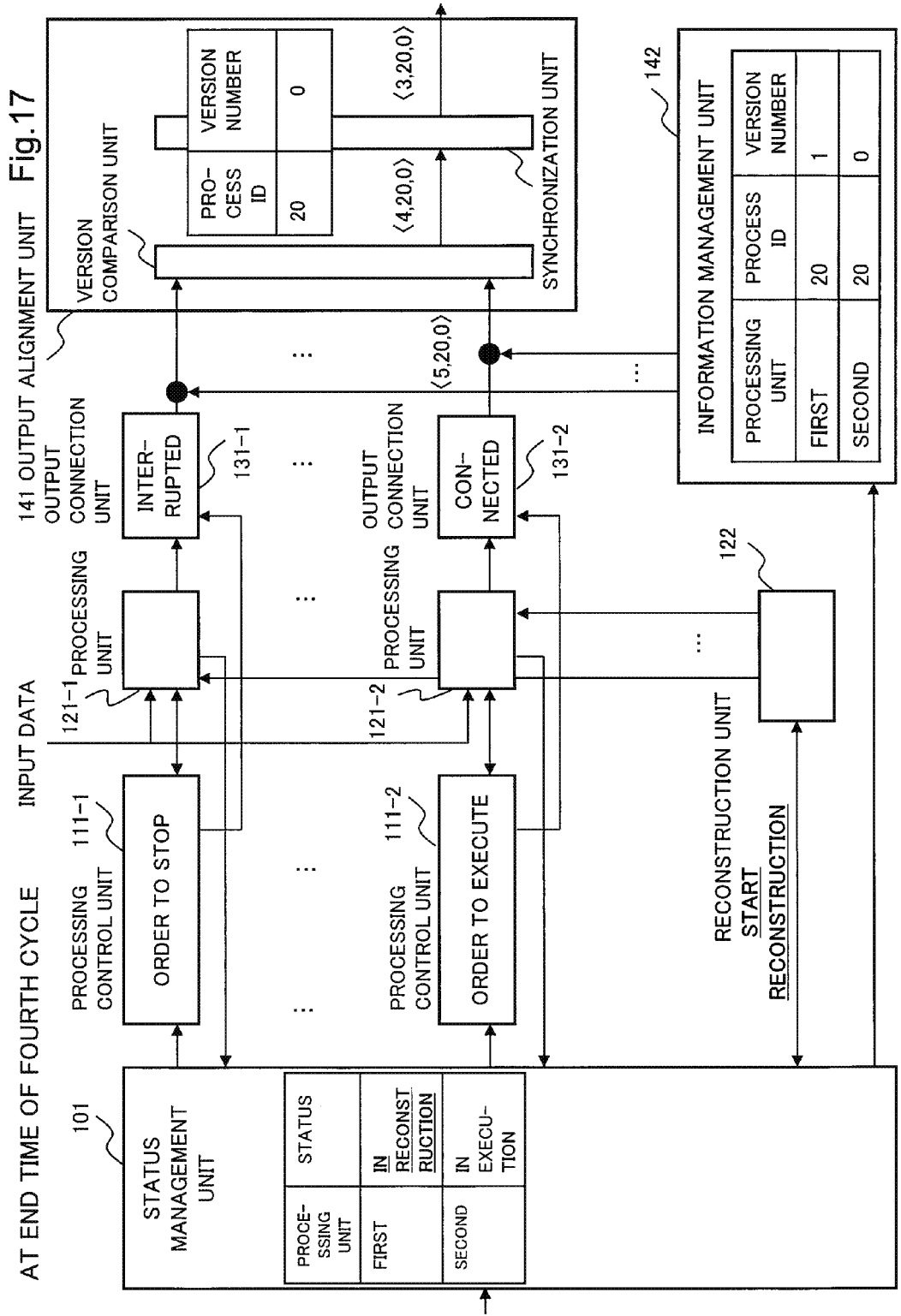
FIG. 17 A figure showing a status in each unit at end time of the fourth cycle of a specific example of operation of an exemplary embodiment of the present invention.

At end time of the fourth cycle, each part of the device will be in the status as shown in FIG. 17.

At start time of the fifth cycle, input data "5" is given to the second processing unit 121-2 and the second processing unit 121-2 generates results data "6", and at end time of the fifth cycle, <6, 20, 0> is outputted to the output alignment unit 141. Also, the version comparison unit 121A inputs <5, 20, 0> at start time of the fifth cycle, and sends this set of the results data to the synchronization unit 131A at end time of the fifth cycle. Also, the synchronization unit 131A inputs <4, 20, 0> at start time of the fifth cycle, and outputs this set of the results data to the output port to device exterior at end time of the fifth cycle.

From the start time of the fifth cycle, the reconstruction unit 122 reconstructs the first processing unit 121-1 (Step 1114).

Figure 18:
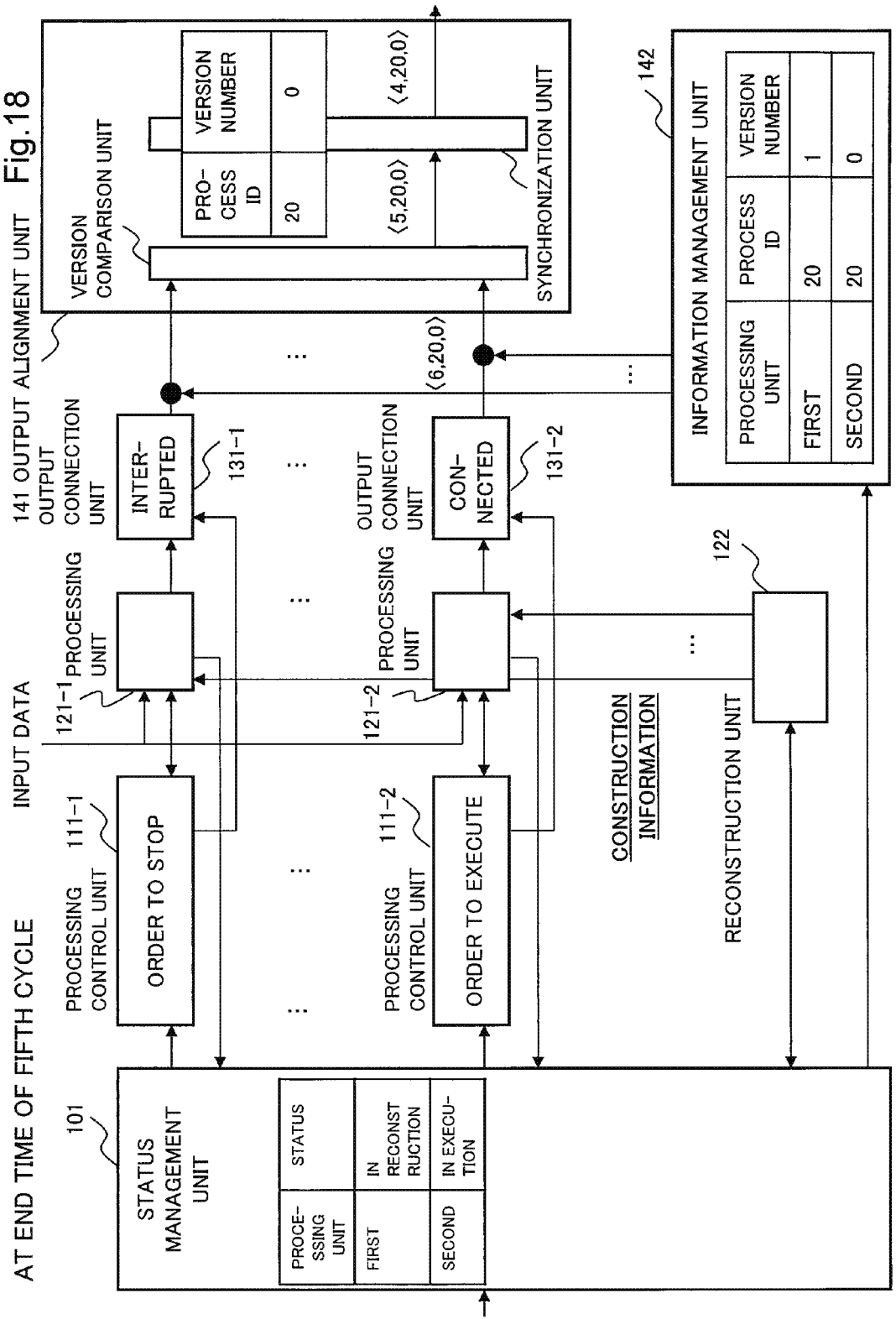
FIG. 18 A figure showing a status in each unit at end time of the fifth cycle of a specific example of operation of an exemplary embodiment of the present invention.

These processes are completed within 1 cycle. At end time of the fifth cycle, each part of the device will be in the status as shown in FIG. 18.

At start time of the sixth cycle, input data "6" is given to the second processing unit 121-2 and the second processing unit 121-2 generates results data "7", and at end time of the sixth cycle, <7, 20, 0> is outputted to the output alignment unit 141. Also, the version comparison unit 121A inputs <6, 20, 0> at start time of the sixth cycle, and sends this set of the results data to the synchronization unit 131A at end time of the sixth cycle. Also, the synchronization unit 131A inputs <5, 20, 0> at start time of the sixth cycle, and outputs this set of the results data to the output port to device exterior at end time of the sixth cycle.

From the start time of the sixth cycle, the reconstruction unit 122 issues notification of reconstruction completed. Next, upon receipt of the notification of reconstruction completed, the status management unit 101 issues the order to start sequence to the processing control unit 111-1 connected to the first processing unit 121-1 (Step S1115). The status management unit 101 changes the status of the first processing unit 121-1 to "in execution".

Next, the processing control unit 111 starts the new process that exists in the first processing unit 121-1 (Step S1116).

Figure 19:
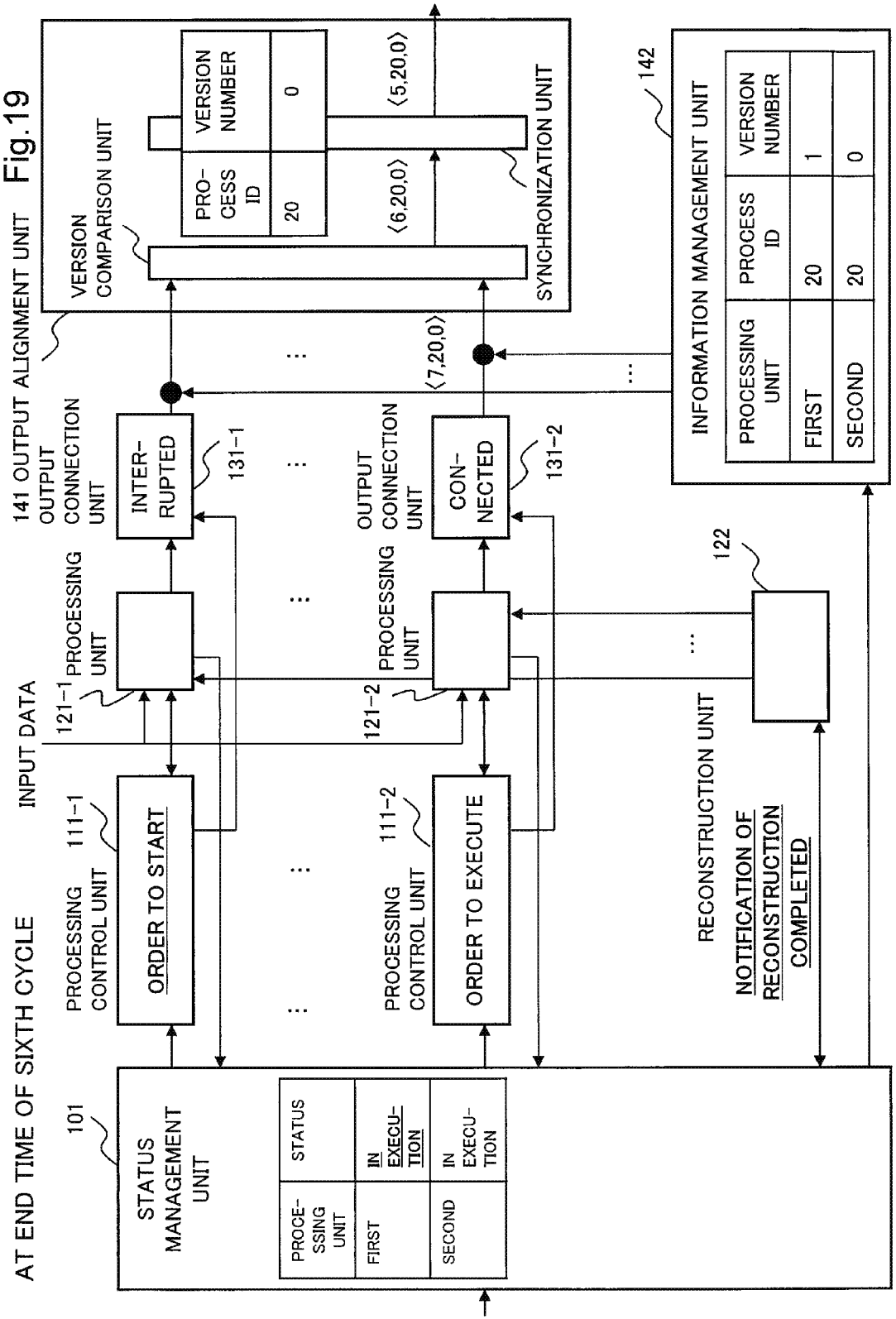
FIG. 19 A figure showing a status in each unit at end time of the sixth cycle of a specific example of operation of an exemplary embodiment of the present invention.

These processes are completed within 1 cycle. At end time of the sixth cycle, each part of the device will be in the status as shown in FIG. 19.

At start time of the seventh cycle, input data "7" is given to the second processing unit 121-2 and the second processing unit 121-2 generates results data "8", and at end time of the seventh cycle, <8, 20, 0> is outputted to the output alignment unit 141. Also, the version comparison unit 121A inputs <7, 20, 0> at start time of the seventh cycle, and sends this set of the results data to the synchronization unit 131A at end time of the seventh cycle. Also, the synchronization unit 131A inputs <6, 20, 0> at start time of the seventh cycle, and outputs this set of the results data to the output port to device exterior at end time of the seventh cycle.

From the start time of the seventh cycle, the processing control unit 111 examines whether start of the new process that exists in the first processing unit 121-1 is successful (Step S1117). Here, it is supposed that it is successful and step proceeds to Step S1118.

Next, the processing control unit 111-1 issues the order to connect of the results data of the new process that operates in the first processing unit 121-1 to the output connection unit 131 (Step S1118).

Next, the output connection unit 131-1 makes the results data of the new process that operates in the first processing unit 121-1 to be outputted to the output alignment unit 141 (Step S1119). These processes are completed within 1 cycle.

Figure 20:
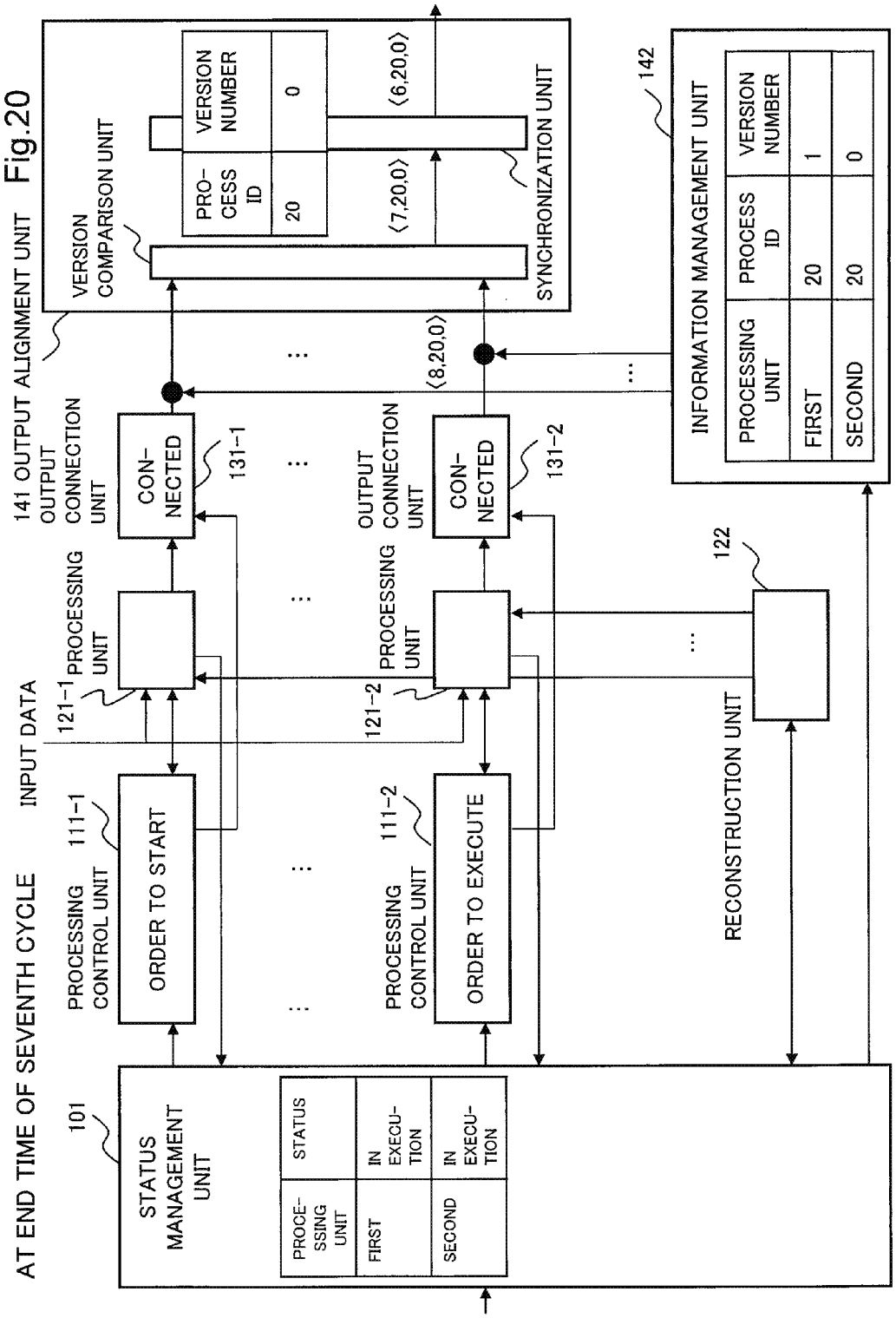
FIG. 20 A figure showing a status in each unit at end time of the seventh cycle of a specific example of operation of an exemplary embodiment of the present invention.

At end time of the seventh cycle, each part of the device will be in the status as shown in FIG. 20.

At start time of the eighth cycle, the new process has started operation in the first processing unit 121-1, and input data "8" is given and results data "10" is generated. This is outputted to the output alignment unit 141 via the output connection unit 131-1. At the same time, the information management unit 142 sends the process ID "20" and the version number "1" to the output alignment unit 141 (Step S1120). As for the process ID and the version number, respective values of the first processing unit 121-1 that the information management unit 142 records are sent. As a result, the output connection unit 131-1 connected to the first processing unit 121-1 and the information management unit 142 output <10, 20, 1> to the output alignment unit 141 at end time of this cycle.

At start time of the eighth cycle, input data 8 is given to the second processing unit 121-2 and results data 9 is generated. This is outputted to the output alignment unit 141 via the output connection unit 131-2. At the same time, the information management unit 142 sends the process ID 20 and the version number 0 to the output alignment unit 141 (Step S1120). As for the process ID and the version number, respective values of the second processing unit 121-2 that the information management unit 142 records are sent. As a result, the output connection unit 131-2 and the information management unit 142 output <9, 20, 0> to the output alignment unit 141 at end time of this cycle.

Also, the version comparison unit 121A inputs <8, 20, 0> at start time of the eighth cycle, and sends this set of the results data to the synchronization unit 131A at end time of the eighth cycle. Also, the synchronization unit 131A inputs <7, 20, 0> at start time of the eighth cycle, and outputs this set of the results data to the output port to device exterior at end time of the eighth cycle.

Figure 21:
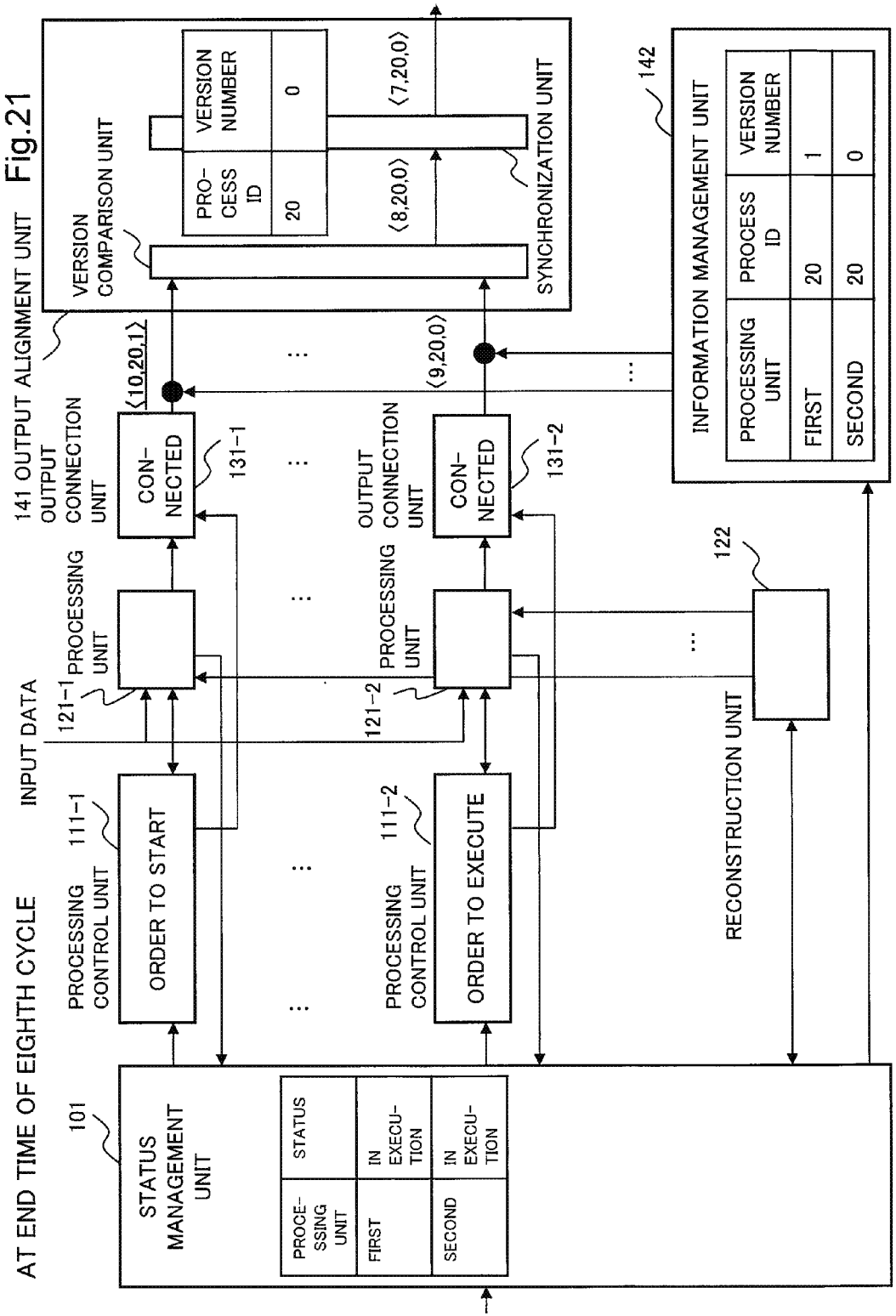
FIG. 21 A figure showing a status in each unit at end time of the eighth cycle of a specific example of operation of an exemplary embodiment of the present invention.

At end time of the eighth cycle, each part of the device will be in the status as shown in FIG. 21.

At start time of the ninth cycle, input data "9" is given to the first processing unit 121-1 and the first processing unit 121-1 generates results data "11", and at end time of the ninth cycle, <11, 20, 1> is outputted to the output alignment unit 141. Also, at start time of the ninth cycle, input data "9" is given to the second processing unit 121-2 and the second processing unit 121-2 generates results data "10", and at end time of the ninth cycle, <10, 20, 0> is outputted to the output alignment unit 141. The version comparison unit 121A inputs <10, 20, 1> and <9, 20, 0> at start time of the ninth cycle (Step S1201).

Since the inputted sets of the results data are the sets of the results data of which the process IDs are identical and the version numbers are different, step proceeds to Step S1203 (Step S1202). And one of which the version number is older by "1", that is, <9, 20, 0>, that is the set of the results data of the old process is discarded (Step S1203).

Since the inputted sets of the results data are two and one is discarded, step proceeds to Step S1204 (Step S1202). Concerning the remaining set of the results data, <10, 20, 1>, arbitration of allocation of the output port is carried out. Since the set of the results data is only one, at end time of the ninth cycle, <10, 20, 1> is sent to the synchronization unit 131A (Step S1204). Also, the synchronization unit 131A inputs <8, 20, 0> at start time of the ninth cycle, and outputs this set of the results data to the output port to device exterior at end time of the ninth cycle.

Figure 22:
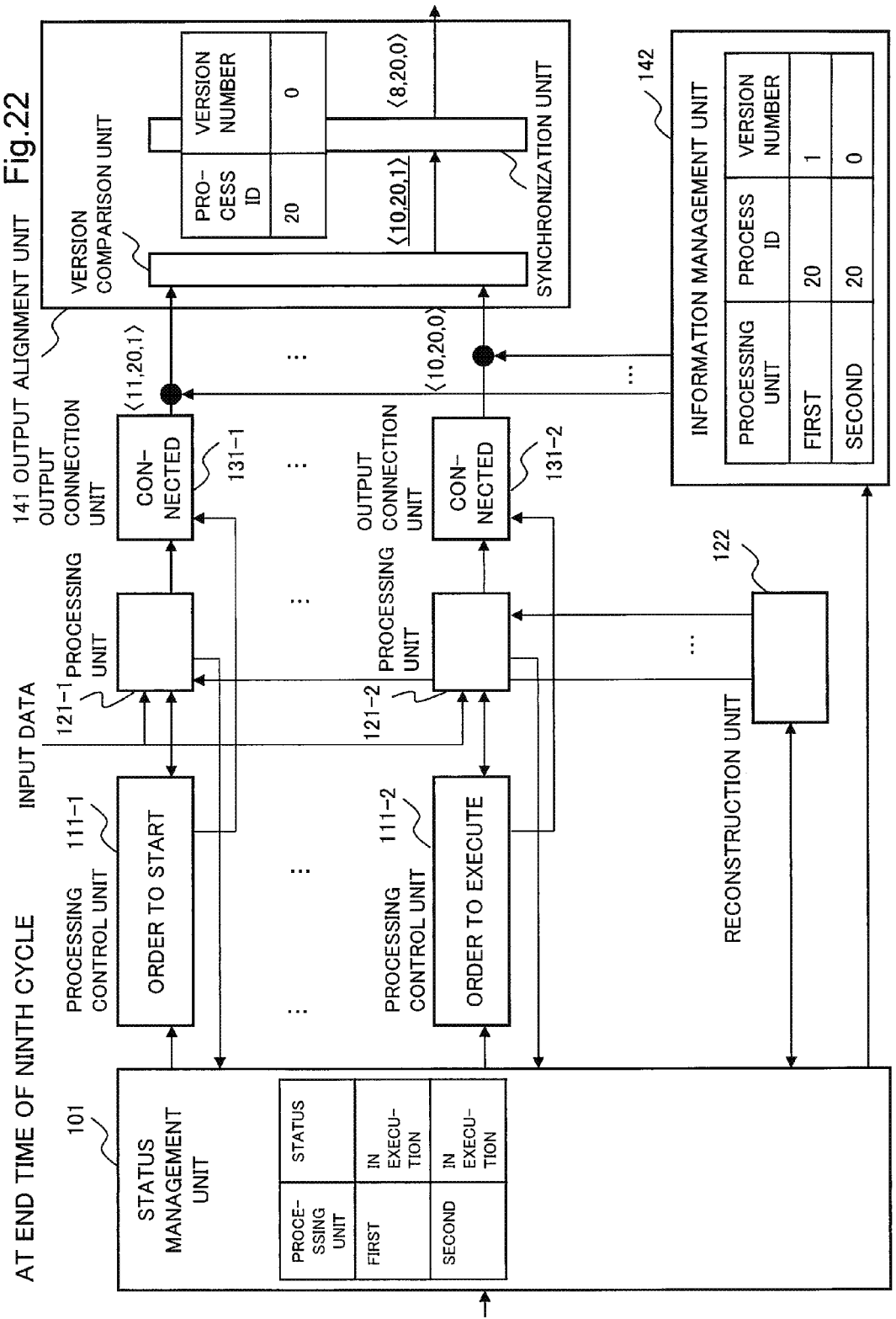
FIG. 22 A figure showing a status in each unit at end time of the ninth cycle of a specific example of operation of an exemplary embodiment of the present invention.

At end time of the ninth cycle, each part of the device will be in the status as shown in FIG. 22.

Figure 23:
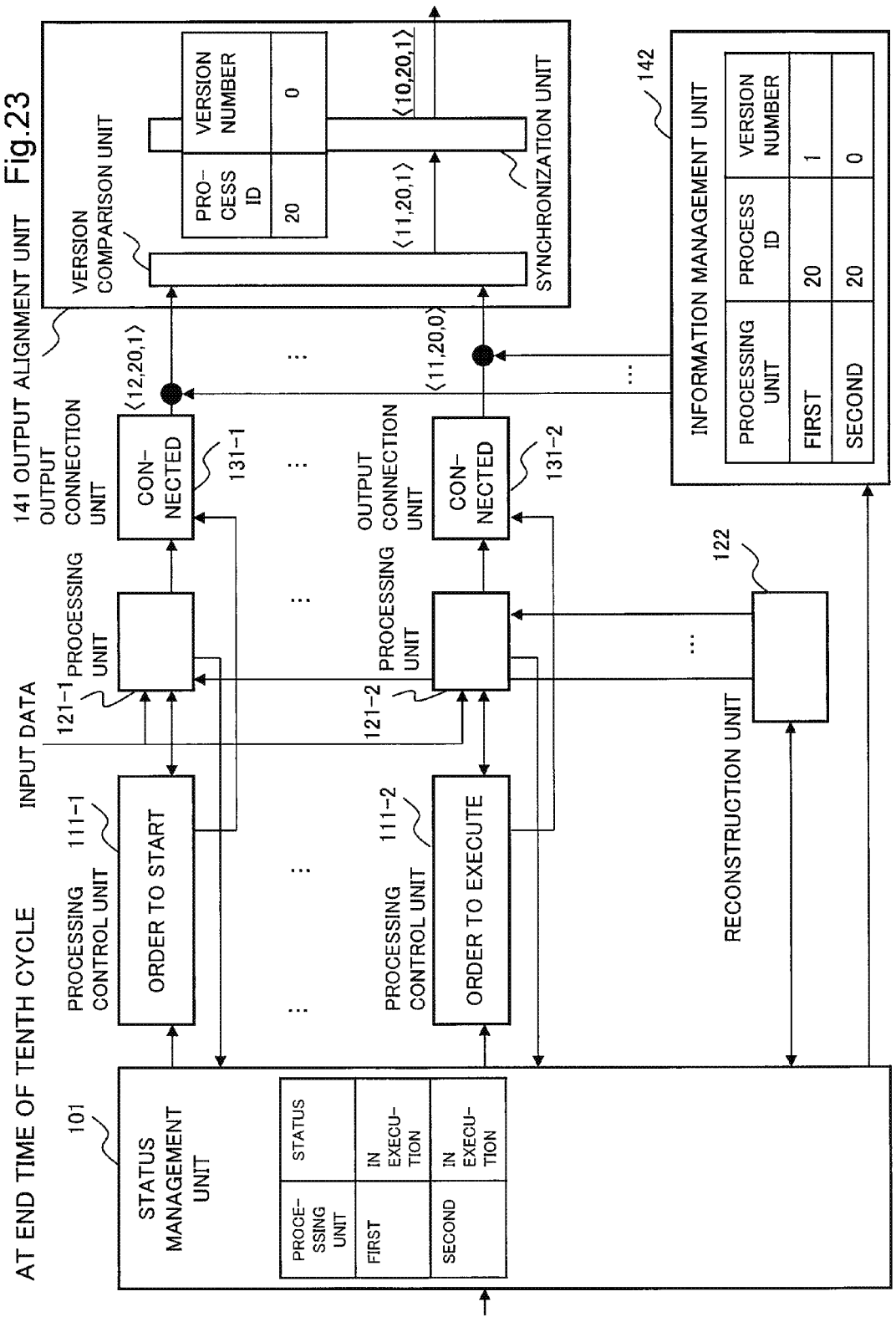
FIG. 23 A figure showing a status in each unit at end time of the tenth cycle of a specific example of operation of an exemplary embodiment of the present invention.

At start time of the tenth cycle, input data "10" is given to the first processing unit 121-1 and the first processing unit 121-1 generates results data "12", and at end time of the tenth cycle, <12, 20, 1> is outputted to the output alignment unit 141. Also, input data "10" is given to the second processing unit 121-2 and the second processing unit 121-2 generates results data "11", and at end time of the tenth cycle, <11, 20, 0> is outputted to the output alignment unit 141. The version comparison unit 121A inputs <11, 20, 1> and <10, 20, 0> at start time of the tenth cycle, discards the set of the results data of the old process, and sends <11, 20, 1> that is the set of the results data of the new process to the synchronization unit 131A at end time of the tenth cycle. Also, the synchronization unit 131A inputs <10, 20, 1> at start time of the tenth cycle (Step S1300). Concerning the process ID 20 of the inputted set of the results data, the version number recorded in the synchronization unit 131A is "0". Since the version number of the inputted set of the results data is newer, step proceeds to Step S1302 (Step S1301). And the version number recorded in the synchronization unit 131A is updated to the version number of the inputted set of the results data 1 (S1302). And at end time of the tenth cycle, the inputted set of the results data, <10, 20, 1>, is outputted to the output port to device exterior (Step S1303). At end time of the tenth cycle, each part of the device will be in the status as shown in FIG. 23.

Figure 24:
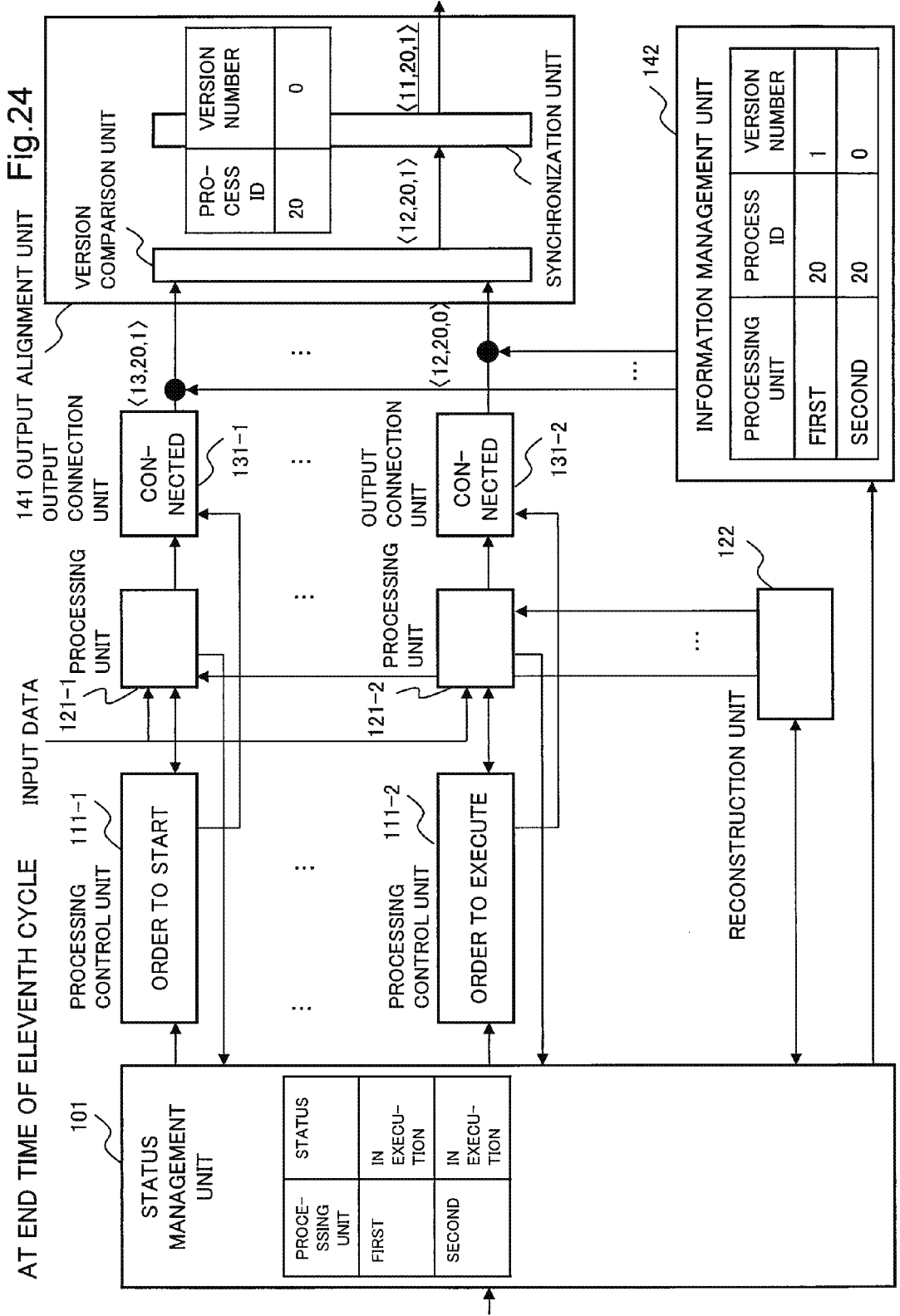
FIG. 24 A figure showing a status in each unit at end time of the eleventh cycle of a specific example of operation of an exemplary embodiment of the present invention.
Figure 26:
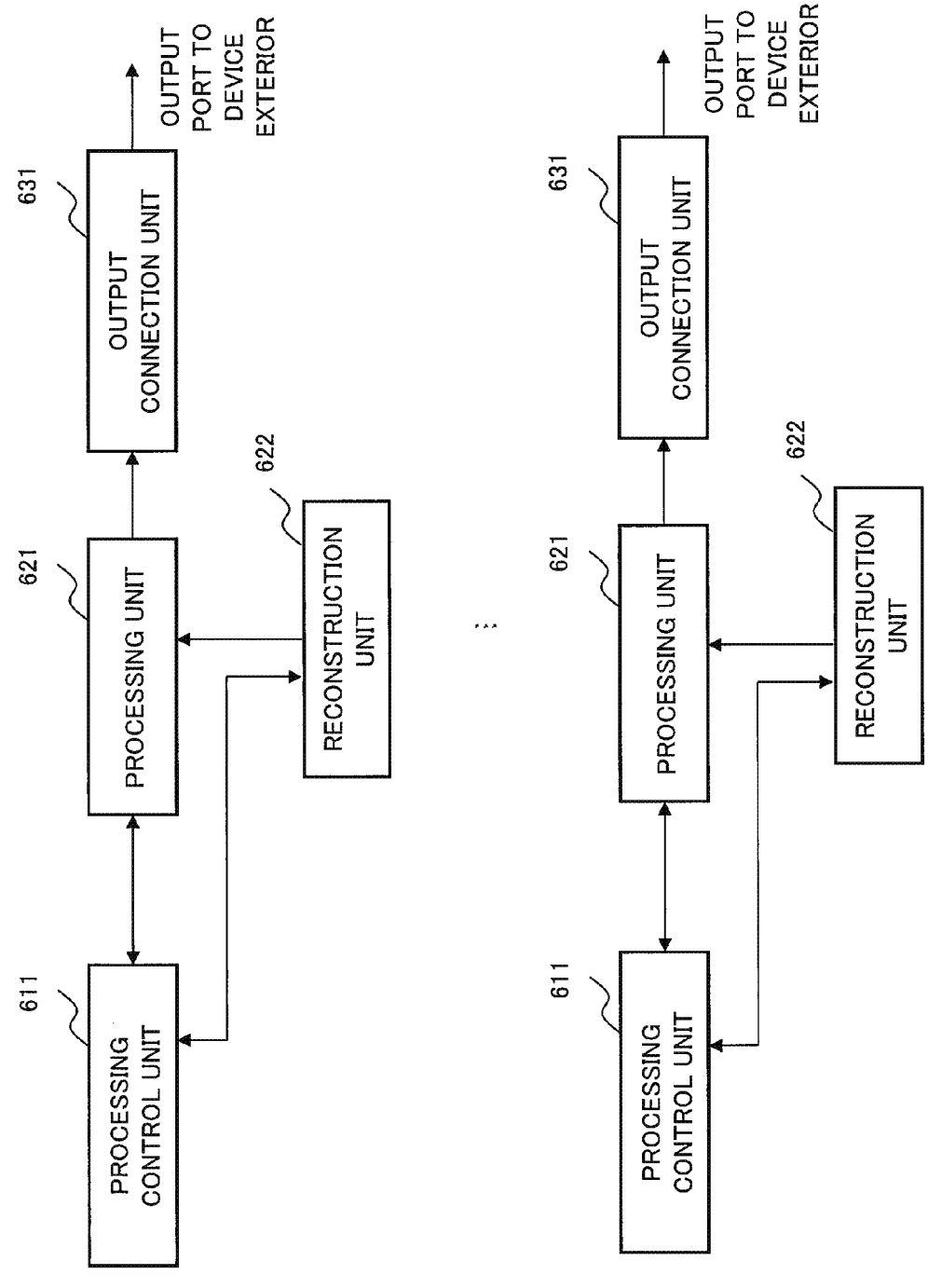
FIG. 26 A block diagram showing a construction of a time series data processing device of PTL 1.
Figure 27:
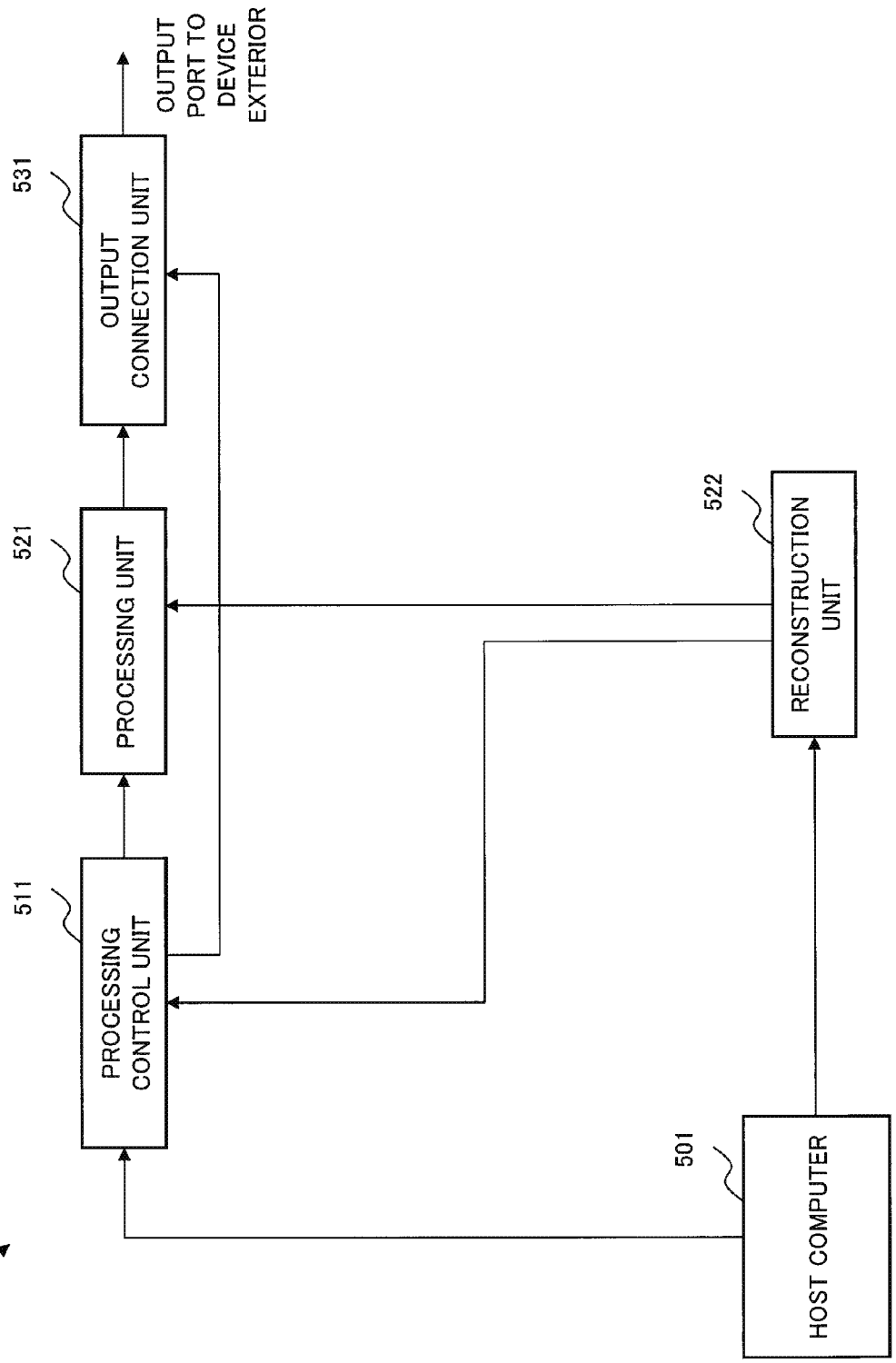
FIG. 27 A block diagram showing a construction of a time series data processing device of NPL 1.
Figure 28:
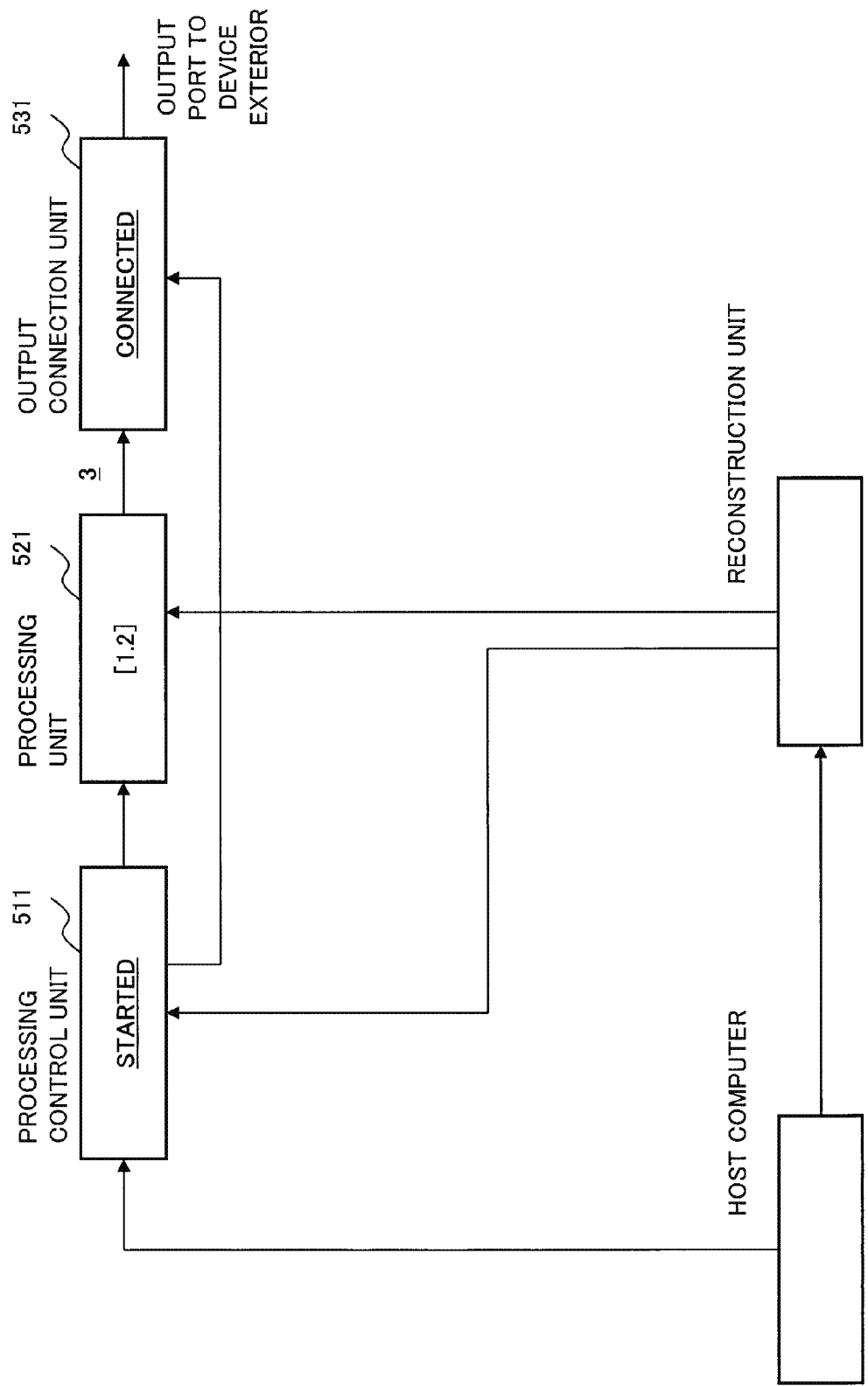
FIG. 28 A figure showing a status of output data in each unit at end time of the second cycle of a time series data processing device of NPL 1.
Figure 29:
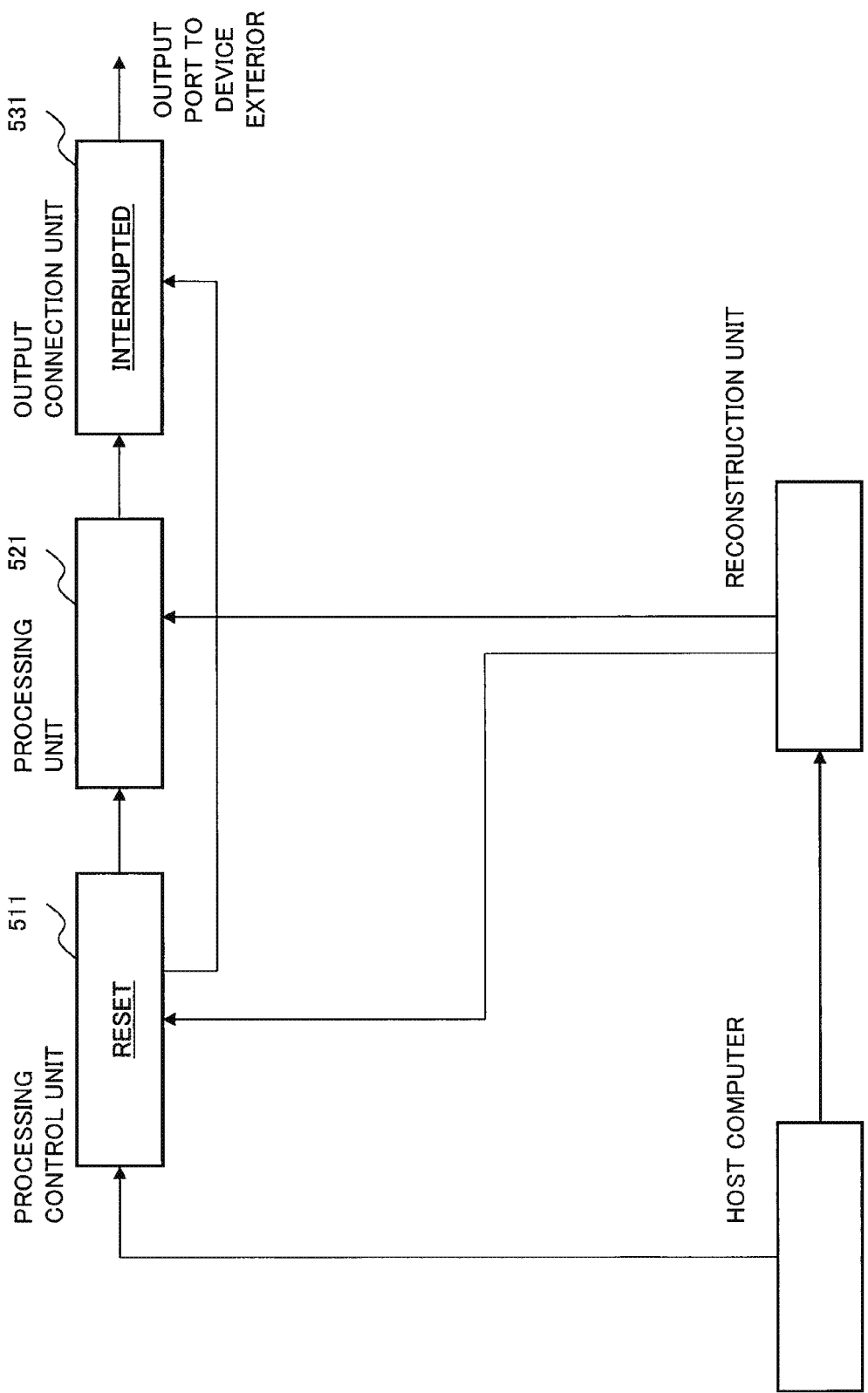
FIG. 29 A figure showing a status of output data in each unit at end time of the third cycle of a time series data processing device of NPL 1.
Figure 30:
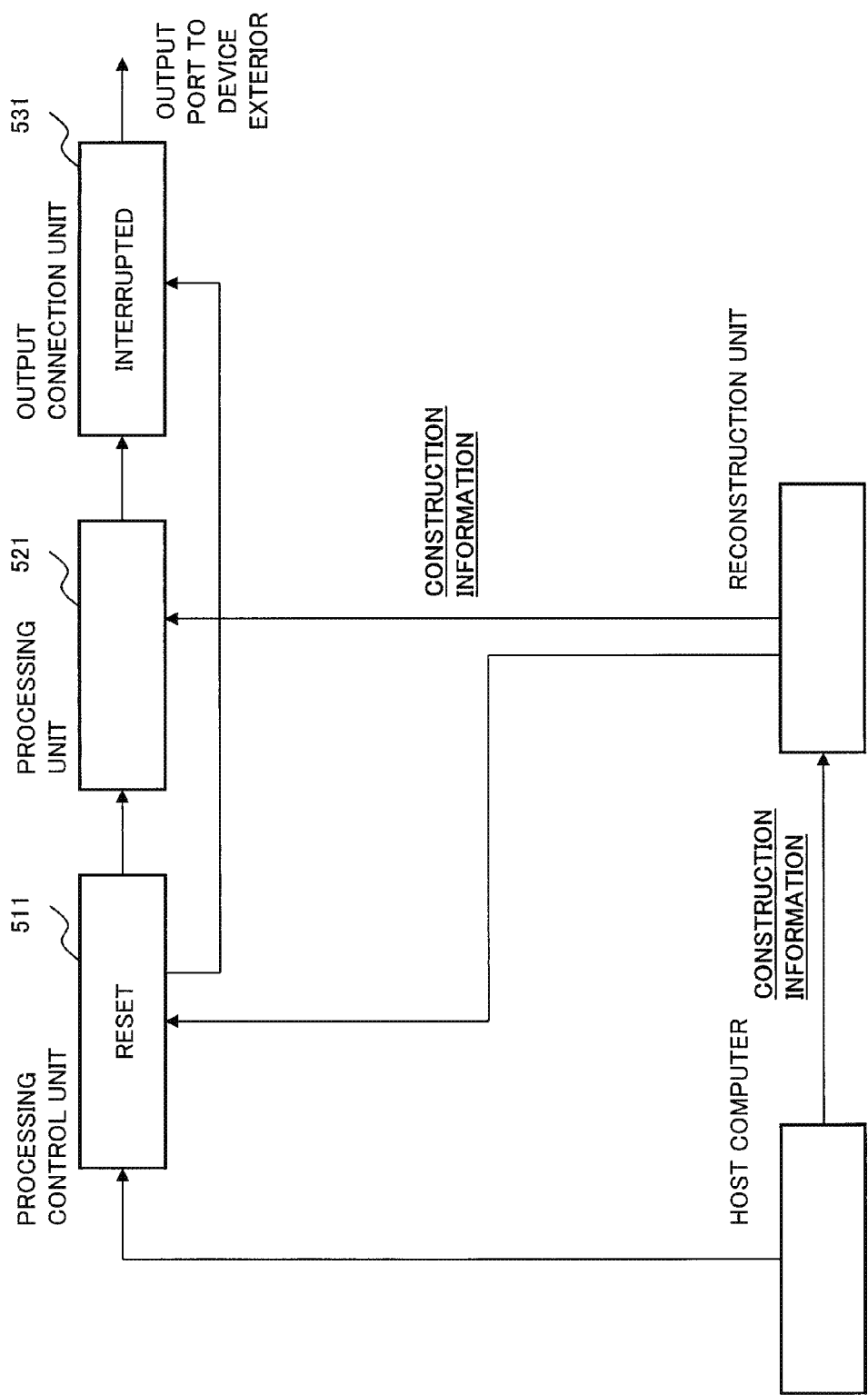
FIG. 30 A figure showing a flow of construction information at end time of the third cycle of a time series data processing device of NPL 1.
Figure 31:
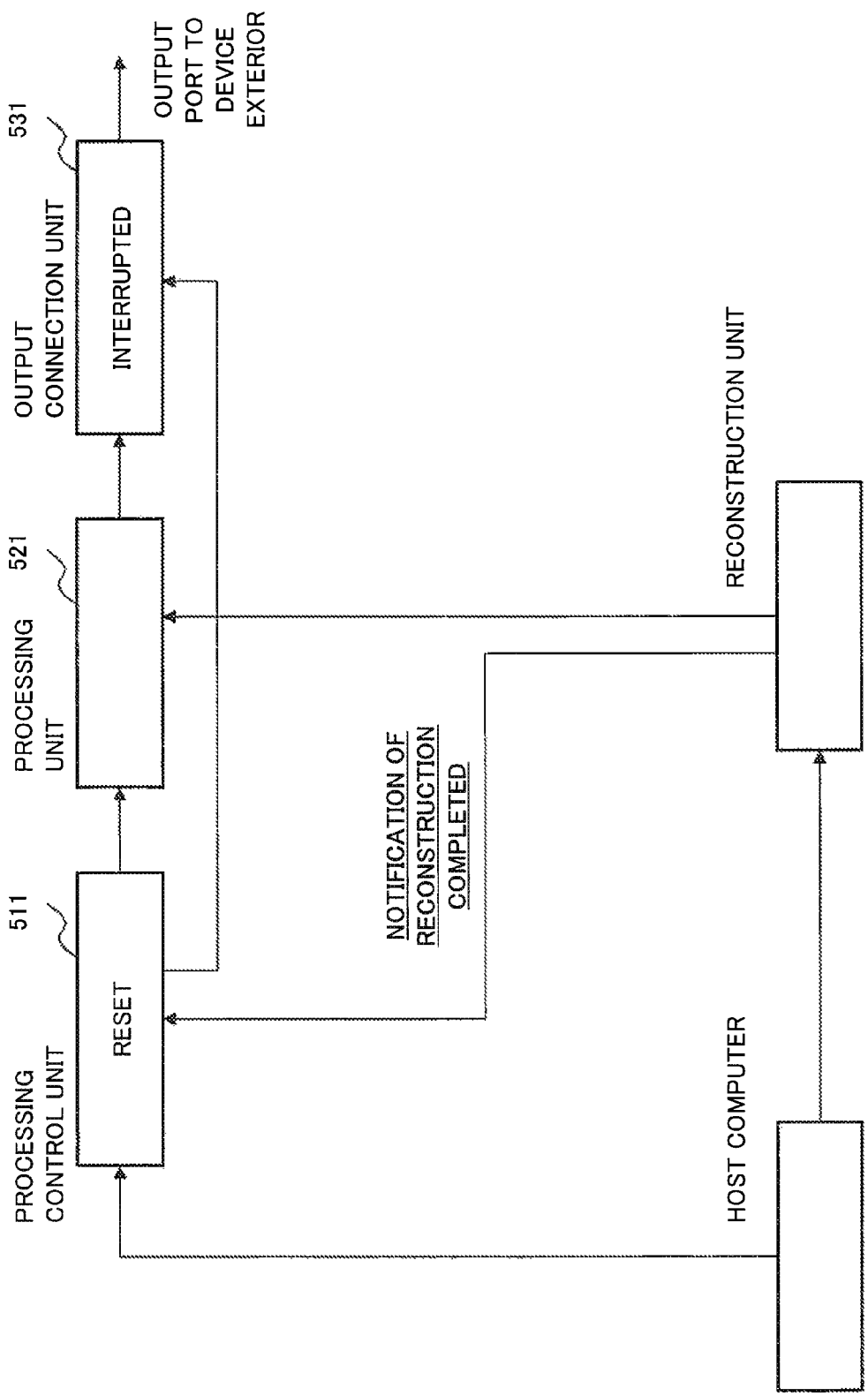
FIG. 31 A figure showing a status of output data in each unit at end time of the fourteenth cycle of a time series data processing device of NPL 1.
Figure 32:
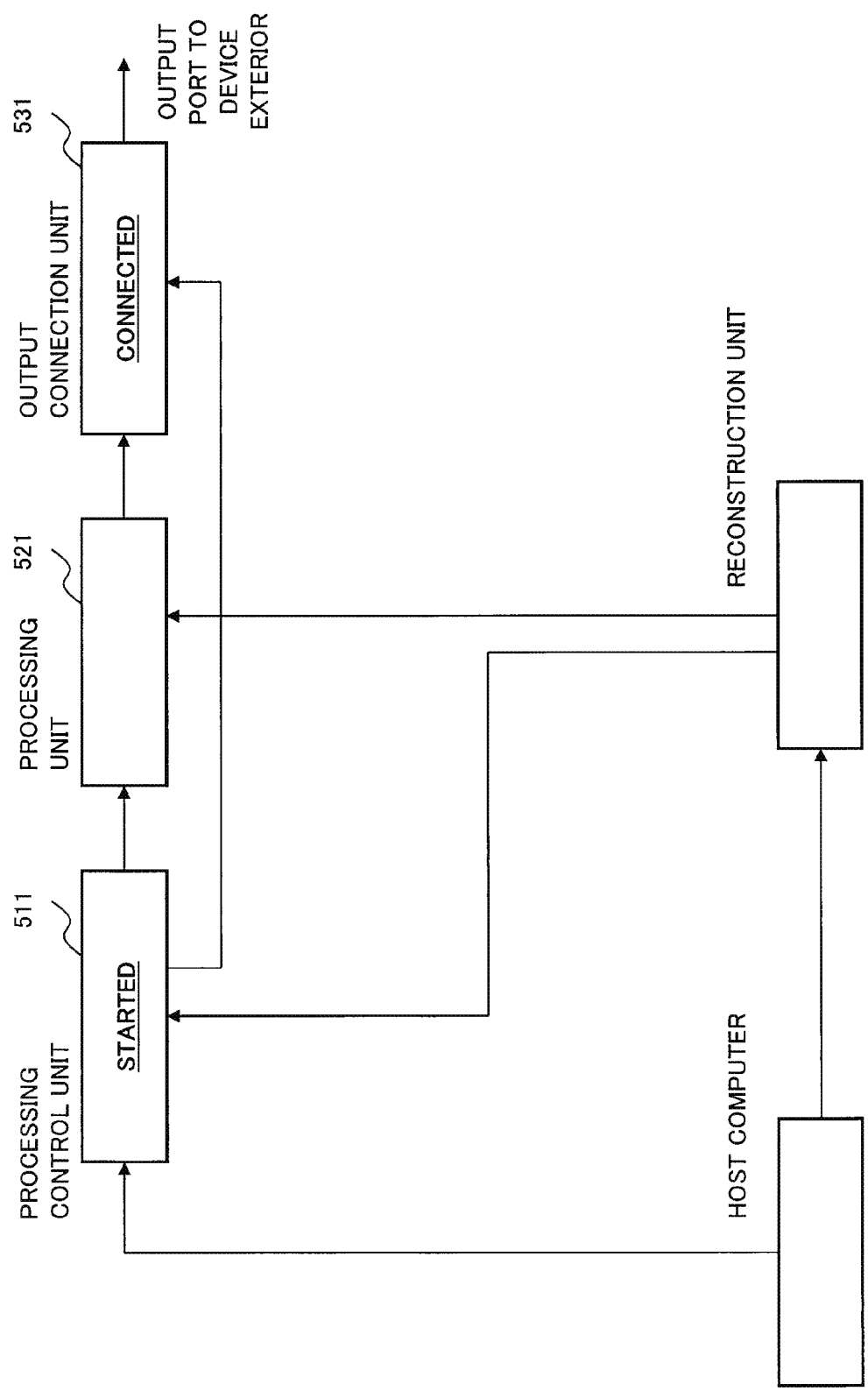
FIG. 32 A figure showing a status of output data in each unit at end time of the fifteenth cycle of a time series data processing device of NPL 1.

At start time of the eleventh cycle, input data "11" is given to the first processing unit 121-1 and the first processing unit 121-1 generates results data "13", and at end time of the eleventh cycle, <13, 20, 1> is outputted to the output alignment unit 141. Also, input data "11" is given to the second processing unit 121-2 and the second processing unit 121-2 generates results data "12", and at end time of the eleventh cycle, <12, 20, 0> is outputted to the output alignment unit 141. The version comparison unit 121A inputs <12, 20, 1> and <11, 20, 0> at start time of the eleventh cycle, discards the set of the results data of the old process, and sends <12, 20, 1> that is the set of the results data of the new process to the synchronization unit 131A at end time of the eleventh cycle. Also, the synchronization unit 131A inputs <11, 20, 1> at start time of the eleventh cycle (Step S1300). Concerning the process ID 20 of the inputted set of the results data, the version number recorded in the synchronization unit 131A is "1". Since it is identical with the version number of the inputted set of the results data, step proceeds to Step S1302 (Step S1301). And the version number recorded in the synchronization unit 131A is updated to the version number of the inputted set of the results data "1" (S1302). And at end time of the eleventh cycle, the inputted set of the results data, <11, 20, 1>, is outputted to the output port to device exterior (Step S1303). At end time of the eleventh cycle, each part of the device will be in the status as shown in FIG. 24.

Hereafter, the same operation is repeated. That is, the sets of the results data of the old process are discarded, and the sets of the results data of the new process continue to be outputted to the output port to device exterior.

Further, in this exemplary embodiment, as mentioned above, it is assumed that both the new process and the old process are realized, after writing the circuit information to execute each process in the circuit element that can be reconstructed like an FPGA, by operating the circuit. However, the realization method of the new process and the old process is not limited to the realization method by hardware as mentioned above. That is, as described above, the method by software that makes processors equipped in the first processing unit 121-1 and the second processing unit 121-2 execute the program may be used. In the realization method by software, it is enough that "the partition" mentioned above is replaced by "the memory", and "the circuit setting information" such as construction data and configuration data is replaced by and understood as "the program".

As above, after confirming the completion of the process in the first processing unit, the time series data processing device of the exemplary embodiment of the present invention replaces the process in the first processing unit by the new process. This replacement of the process is executed when the old process is being executed in the second processing unit. Therefore, while continuing execution of the old process, execution of the new process can be started. And the identification information is appended to the results data of each process. Accordingly, it has the effect that switch from the old process to the new process can be carried out without stopping the processes.

In this exemplary embodiment, explanation was made by taking the change from the second user defined process (the old process) to the third user defined process (the new process) as an example. In this exemplary embodiment, the old process is executed in the second processing unit 121-2, and the new process is executed in the first processing unit 121-1. Since the time series data processing device 100 is equipped with the processing control units being made to correspond to each processing unit, even if the processing unit that executes each process is switched, it can operate similarly.

In an application for which to correspond only to change of the process from the old process to the new process is enough, the function to stop the old process is unnecessary. In other words, it is not indispensable that the time series data processing device 100 is equipped with the processing control unit 111-2.

Also, to output the results data to exterior or not is possible by the control in the output alignment unit 141 using the identification information appended to the results data. Accordingly, it is not indispensable either that the time series data processing device 100 is equipped with the connection unit 131-2.

Figure 1:
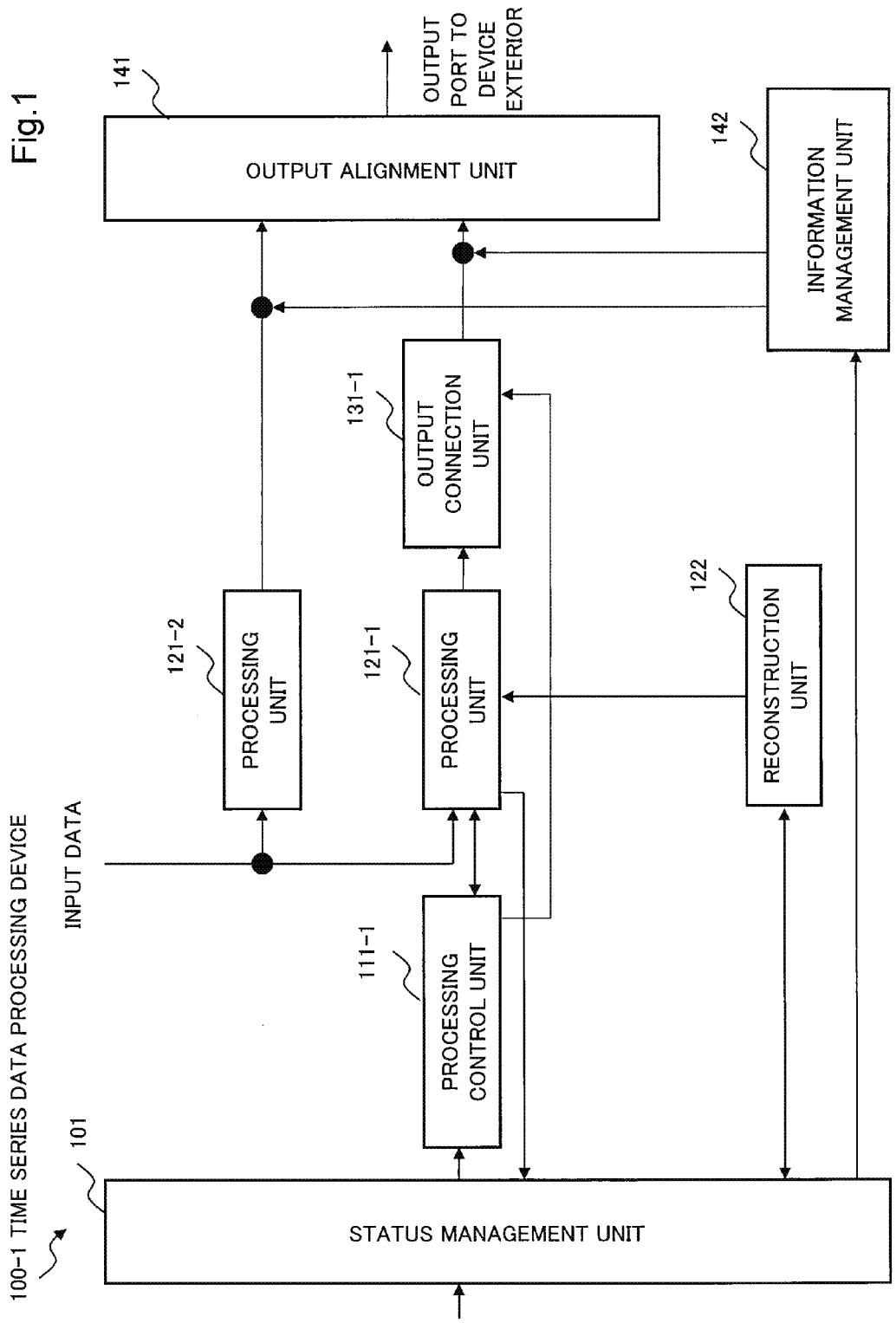
FIG. 1 A block diagram showing an indispensable construction of a time series data processing device of an exemplary embodiment of the present invention.

FIG. 1 is a block diagram showing a construction of a time series data processing device 100-1 of this exemplary embodiment equipped with only an indispensable construction.

The time series data processing device 100-1 is equipped with: the first processing unit 121-1, the second processing unit 121-2, the status management unit 101, the processing control unit 111-1, the reconstruction unit 122, the output connection unit 131-1, the information management unit 142 and the output alignment unit 141. The time series data processing device 100-1 is not equipped with the processing control unit 111-2 and the output connection unit 131-2.

The first processing unit 121-1 and the second processing unit 121-2 are the same as that of the time series data processing device 100.

In order only to control start and stop of the first processing unit 121-1, the status management unit 101 controls only the processing control unit 111-1.

The processing control unit 111-1 carried out start and stop of the first processing unit 121-1 similar to that of the time series data processing device 100.

The reconstruction unit 122 carries out reconstruction of only the first processing unit 121-1.

The output connection unit 131-1 controls to output the results data or not that the first processing unit 121-1 generated.

The information management unit 142 sets "the identification information" corresponding to the contents of the process that the first processing unit 121-1 and the second processing unit 121-2 execute. By the difference of the identification information, the difference in the processes that the first processing unit 121-1 and the second processing unit 121-2 carried out can be identified. In the identification information, "the process ID" and "the version number" mentioned above are included. In the explanation of the exemplary embodiment, an example using the process ID and the version number as the identification information was shown. However, since there are no essential differences between the process ID and the version number, other information can be used as far as it is "the identification information" that can identify that the contents of the process have changed.

The output alignment unit 141 inputs the identification information that was appended to the results data that the first processing unit 121-1 and the second processing unit 121-2 generated. And the output alignment unit 141 decides output order to device exterior and propriety of output of the results data, and outputs the results data to device exterior.

By being equipped with the construction mentioned above, although the time series data processing device 100-1 cannot stop the old process, it can correspond to the change from the old process to the new process without any problems.

Further, the time series data processing device 100 of the present invention can be realized by software. The flow charts of the program that controls the time series data processing device are same as from FIG. 7 to FIG. 11. That is, the processes that the status management unit 101, the processing control units 111-1 and 111-2, the reconstruction unit 122, the output disconnection units 131-1 and 131-2, the information management unit 142 and the output alignment unit 141 carry out may be realized by a processor (not illustrated) being equipped in the time series data processing device executing the program.

The program mentioned above may be stored in a semiconductor memory device such as ROM (Read Only Memory), RAM (Random Access Memory) and a flash memory and a non-transitory medium such as an optical disc, a magnetic disk and a magneto-optical disk.

As above, although the present invention has been explained with reference to the exemplary embodiments above, the present invention is not limited to the exemplary embodiments mentioned above. Various changes which a person skilled in the art can understand within the scope of the present invention can be performed in the construction of the present invention and details.

This application claims priority based on Japanese Patent Application No. 2012-060863 filed on Mar. 16, 2012 and the disclosure thereof is incorporated herein in its entirety.

REFERENCE SIGNS LIST 100, 100-1 Time series data processing device
101 Status management unit
111, 111-1, 111-2 Processing control unit
121, 121-1, 121-2 Processing unit
121A Version comparison unit
122 Reconstruction unit
131, 131-1, 131-2 Output connection unit
131A Synchronization unit
141 Output alignment unit
142 Information management unit
500 Time series data processing device
501 Host computer
511 Processing control unit
521 Processing unit
522 Reconstruction unit
531 Output connection unit
600 Time series data processing device
611 Processing control unit
621 Processing unit
622 Reconstruction unit
631 Output connection unit
1001 Partial version comparison unit
1002 Waiting data queue
1003 Arbitration unit

The invention claimed is:

1. A time series data processing device, comprising: a first processing unit that is possible to reconstruct and that executes a first process or a third process and generates first results data or third results data;
a second processing unit that executes a second process and generates second results data;
a reconstruction unit that changes the process executed by said first processing unit from said first process to the third process;

a first processing control unit that executes stop of said first process in said first processing unit and start of said third process in said first processing unit, and enables or prohibits output of said first results data and said third results data;

a first output control unit that enables or prohibits output of said first results data and said third results data on the basis of an instruction of said first processing control unit;

an information management unit that generates a first set of the results data by appending first identification information corresponding to contents of said first process to said first results data, generates a second set of the results data by appending second identification information corresponding to contents of said second process to said second results data, and generates a third set of the results data by appending third identification information corresponding to contents of said third process to said third results data;

a status management unit that, when an instruction to change process is received from outside, instructs said first processing control unit to stop said first process, to start said third process, and to enable or to prohibit output of said first results data and said third results data, instructs said reconstruction unit to change from said first process to said third process, and instructs said information management unit to append said second identification information and said third identification information; and an output alignment unit that inputs said third set of the results data from said first output control unit and said second set of the results data from said second output control unit, selects either of said third set of the results data or said second set of the results data on the basis of said third identification information and said second identification information, and outputs the results data included in said selected set of the results data.

2. The time series data processing device according to claim 1, wherein
said first processing unit outputs a first notification of completion that shows that said first process has been completed to said status management unit;
said reconstruction unit outputs a second notification of completion that shows that change from said first process to the third process has been completed to said status management unit; and
said status management unit instructs said first processing control unit on the basis of said first notification of completion to prohibit output of said first results data, and after instructing said reconstruction unit on the basis of said second notification of completion to change from said first process to said third process, instructs said first processing control unit to start said third process and to enable output of said third results data.

3. The time series data processing device according to claim 2, further comprising: a second processing control unit that executes stop and start of said second process in said second processing unit and enables or prohibits output of said second results data; and
a second output control unit that enables or prohibits output of said second results data; wherein
said second processing unit is possible to reconstruct and outputs a third notification of completion that shows that said second process has been completed to said status management unit; and said status management unit instructs said second processing control unit to enable or prohibit output of said second results data.

4. The time series data processing device according to claim 3, wherein characterized by that
said first identification information includes a first identifier that shows contents of said first process and a first version number that shows change history of said first process;
said second identification information includes a second identifier that shows contents of said second process and a second version number that shows change history of said second process;
said third identification information includes a third identifier that shows contents of said third process and a third version number that shows change history of said third process; and
said output alignment unit, when said second set of the results data and said third set of the results data arrive simultaneously, said second identifier and said third identifier are equal, and said third version number is newer than said second version number, selects said third results data as a fourth set of the results data and discards said second set of the results data.

5. The time series data processing device according to claim 4, wherein
before said third notification of completion is inputted, said control unit appends as said third identifier the same value as said second identifier and appends as said third version number the version number older than said second version number; and
after said third notification of completion is inputted, said control unit appends as said third identifier the same value as said second identifier and appends as said third version number the version number newer than said second version number.

6. The time series data processing device according to claim 1, wherein characterized by that
said first identification information includes a first identifier that shows contents of said first process and a first version number that shows change history of said first process;
said second identification information includes a second identifier that shows contents of said second process and a second version number that shows change history of said second process;
said third identification information includes a third identifier that shows contents of said third process and a third version number that shows change history of said third process; and
said output alignment unit, when said second set of the results data and said third set of the results data arrive simultaneously, said second identifier and said third identifier are equal, and said third version number is newer than said second version number, selects said third results data as a fourth set of the results data and discards said second set of the results data.

7. The time series data processing device according to claim 2, wherein characterized by that
said first identification information includes a first identifier that shows contents of said first process and a first version number that shows change history of said first process;
said second identification information includes a second identifier that shows contents of said second process and a second version number that shows change history of said second process;

said third identification information includes a third identifier that shows contents of said third process and a third version number that shows change history of said third process; and said output alignment unit, when said second set of the results data and said third set of the results data arrive simultaneously, said second identifier and said third identifier are equal, and said third version number is newer than said second version number, selects said third results data as a fourth set of the results data and discards said second set of the results data.

8. A time series data processing method, comprising:

generating first results data by executing a first process in a first processing unit;

generating a first set of the results data by appending first identification information corresponding to contents of said first process to said first results data;

generating second results data by executing a second process in a second processing unit;

generating a second set of the results data by appending second identification information corresponding to contents of said second process to said second results data;

when an instruction to change process is received from outside, stopping said first process in said first processing unit and prohibiting output of said first results data;

changing the process executed by said first processing unit from said first process to a third process;

starting said third process, and enabling output of said third results data;

generating a third set of the results data by appending third identification information corresponding to contents of said third process to said third results data;

inputting said third set of the results data from said first output control unit, and inputting said second set of the results data from said second output control unit; and selecting either of said third set of the results data or said second set of the results data on the basis of said third identification information and said second identification information, and outputting the results data included in said selected set of the results data.

9. A non-transitory storage medium that stores a time series data processing program making a computer equipped in a time series data processing device equipped with a first processing unit that executes a first process and outputs first results data and a second processing unit that executes a second process and outputs second results data, function as:

a reconstruction means that changes the process executed by said first processing unit from said first process to a third process;

a first processing control means that executes stop of said first process in said first processing unit and start of said third process in said first processing unit, and enables or prohibits output of said first results data and said third results data;

a first output control means that enables or prohibits output of said first results data and said third results data on the basis of an instruction of said first processing control means;

an information management means that generates a first set of the results data by appending first identification information corresponding to contents of said first process to said first results data, generates a second set of the results data by appending second identification information corresponding to contents of said second process to said second results data, and generates a third set of the results data by appending third identification information corresponding to contents of said third process to said third results data;

a status management means that, when an instruction to change process is received from outside, instructs said first processing control means to stop said first process, to start said third process, and to enable or to prohibit output of said first results data and said third results data, instructs said reconstruction means to change from said first process to said third process, and instructs said information management means to append said second identification information and said third identification information; and an output alignment means that inputs said third set of the results data from said first output control unit and said second set of the results data from said second output control unit, selects either of said third set of the results data or said second set of the results data on the basis of said third identification information and said second identification information, and outputs the results data included in said selected set of the results data.

* * * * *